(12) United States Patent
Hall

(10) Patent No.: US 10,428,558 B2
(45) Date of Patent: Oct. 1, 2019

(54) BAND-BASED LOCK

(71) Applicant: DWFritz Automation, Inc., Wilsonville, OR (US)

(72) Inventor: Ryan S. Hall, Keizer, OR (US)

(73) Assignee: OTTO DesignWorks, LLC, Wilsonville, OR (US)

( * ) Notice: Subject to any disclaimer, the term of this patent is extended or adjusted under 35 U.S.C. 154(b) by 141 days.

(21) Appl. No.: 15/259,672

(22) Filed: Sep. 8, 2016

(65) Prior Publication Data

US 2017/0096841 A1   Apr. 6, 2017

Related U.S. Application Data

(60) Provisional application No. 62/218,491, filed on Sep. 14, 2015.

(51) Int. Cl.
| | | |
|---|---|---|
| *E05B 73/00* | (2006.01) | |
| *B60R 25/021* | (2013.01) | |
| *F16B 1/02* | (2006.01) | |
| *F16B 2/08* | (2006.01) | |
| *E05B 37/02* | (2006.01) | |

(Continued)

(52) U.S. Cl.
CPC .... *E05B 73/0005* (2013.01); *B60R 25/02136* (2013.01); *E05B 37/025* (2013.01); *E05B 67/003* (2013.01); *F16B 1/02* (2013.01); *F16B 2/08* (2013.01); *E05B 71/00* (2013.01)

(58) Field of Classification Search
CPC .... E05B 73/0005; E05B 71/00; E05B 37/025; E05B 67/003; B60R 25/02136; F16B 1/02; F16B 2/08

USPC .......... 70/14, 15, 16, 18, 19, 30, 49, 233; 24/593.11, 298, 122

See application file for complete search history.

(56) References Cited

U.S. PATENT DOCUMENTS

| 1,462,238 A | * | 7/1923 | Mennillo | ............ E05B 67/003 |
| | | | | 70/15 |
| 3,257,694 A | * | 6/1966 | Litwin | ..................... F16B 2/08 |
| | | | | 24/16 PB |

(Continued)

FOREIGN PATENT DOCUMENTS

| GB | 2468537 | * | 9/2010 | ............ E05B 73/00 |
| GB | 2524530 | * | 9/2015 | ......... E05B 73/0005 |

(Continued)

*Primary Examiner* — Suzanne L Barrett

(74) *Attorney, Agent, or Firm* — Schwabe, Williamson & Wyatt, P.C.

(57) ABSTRACT

A band-based lock is provided. The band-based lock may include a flexible band with a substantially thin profile and include inner metal layers and wires and/or jacketed metal layers so that the band may be more difficult to cut. The band-based lock may include a feed mechanism coupled to the flexible band. The feed mechanism may provide for the flexible band to be fed through the feed mechanism, putting the flexible band in a loop. The feed mechanism may allow the flexible band to be fed through the feed mechanism in one direction when in a tightening or locked position. The feed mechanism may allow this one-way feed through use of a pawl including one or more teeth engaging with teeth formed on the flexible band. In a release position, the feed mechanism may allow the flexible band to be fed backward through the feed mechanism opening the loop.

19 Claims, 18 Drawing Sheets

(51) Int. Cl.
*E05B 67/00* (2006.01)
*E05B 71/00* (2006.01)

(56) References Cited

U.S. PATENT DOCUMENTS

| | | | | |
|---|---|---|---|---|
| 4,157,602 A | * | 6/1979 | Pennell | E05B 73/0005 24/122.3 |
| 4,177,541 A | * | 12/1979 | Seakan | E05B 73/0005 24/122.3 |
| 4,458,385 A | * | 7/1984 | Espinoza | F16B 2/08 24/16 PB |
| 4,896,519 A | * | 1/1990 | Pitts | B60R 9/08 70/18 |
| 5,230,541 A | * | 7/1993 | Nowak | E05C 19/18 24/16 PB |
| 6,044,669 A | * | 4/2000 | Levi | B62H 5/00 292/307 R |
| 8,313,128 B2 | * | 11/2012 | Belyea | E05B 13/00 292/258 |
| 2003/0164009 A1 | * | 9/2003 | Levi | E05B 67/003 70/18 |
| 2004/0154357 A1 | * | 8/2004 | Young | A41F 1/008 70/18 |
| 2011/0219826 A1 | * | 9/2011 | Jeli | B62H 5/003 70/15 |
| 2012/0042700 A1 | * | 2/2012 | Barron | E05B 17/106 70/15 |
| 2015/0082841 A1 | * | 3/2015 | Lebeaume | E05B 67/003 70/15 |
| 2016/0024818 A1 | * | 1/2016 | Allen | E05B 67/003 70/30 |
| 2016/0153214 A1 | * | 6/2016 | Castro | E05B 67/24 70/49 |
| 2016/0348402 A1 | * | 12/2016 | Barron | E05B 67/003 |
| 2017/0292295 A1 | * | 10/2017 | Alvarado | E05B 71/00 |
| 2018/0042616 A1 | * | 2/2018 | Demas | A61B 17/1327 |

FOREIGN PATENT DOCUMENTS

| | | | | |
|---|---|---|---|---|
| GB | 2537682 | * | 10/2016 | E05B 73/00 |
| JP | 2005-270562 A | | 10/1993 | |
| JP | 2013-124123 A | | 6/2013 | |
| KR | 20-2010-0010248 U | | 10/2010 | |
| KR | 20100010248 U | * | 10/2010 | |

* cited by examiner

Fig. 22A
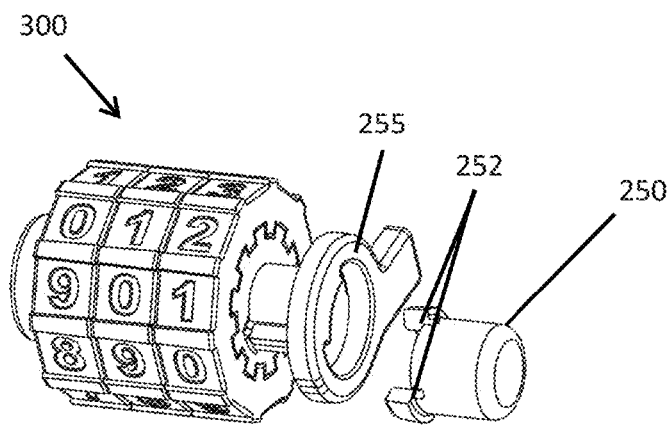
Fig. 22B
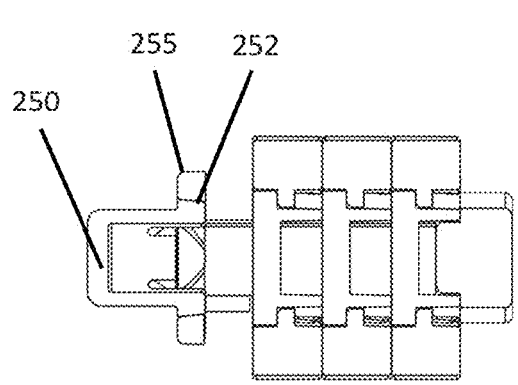 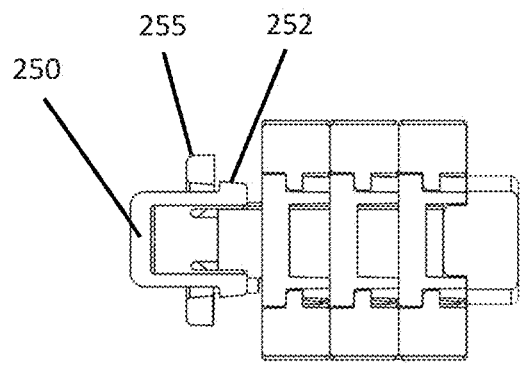

BAND-BASED LOCK

CROSS-REFERENCE TO RELATED APPLICATION

This application claims the priority benefit of the earlier filing date of U.S. Provisional Application No. 62/218,491, filed Sep. 14, 2015, which is specifically incorporated herein by reference in its entirety.

TECHNICAL FIELD

Embodiments herein relate to a band-based lock for securing equipment, such as a bicycle.

BACKGROUND

Portable equipment, such as bicycles, scooters, outdoor furniture, and the like, can frequently fall target of theft. In an effort to combat thieves, locks are frequently used to secure equipment to secure fixed points. However many of these locks have weak points that reduce their effectiveness. For example, some chains and cables used in locks can be easily cut or torn. Some utilize harder-to-cut structures, but are very inflexible and are difficult to use in tight spaces. Others may provide access to their locking mechanisms, allowing them to be picked or otherwise physically disabled without requiring cutting of a cable or chain.

BRIEF DESCRIPTION OF THE DRAWINGS

FIGS. 22A and 22B depict cutaway views of the deformable button, in accordance with various embodiments.

DETAILED DESCRIPTION

Figure 1:
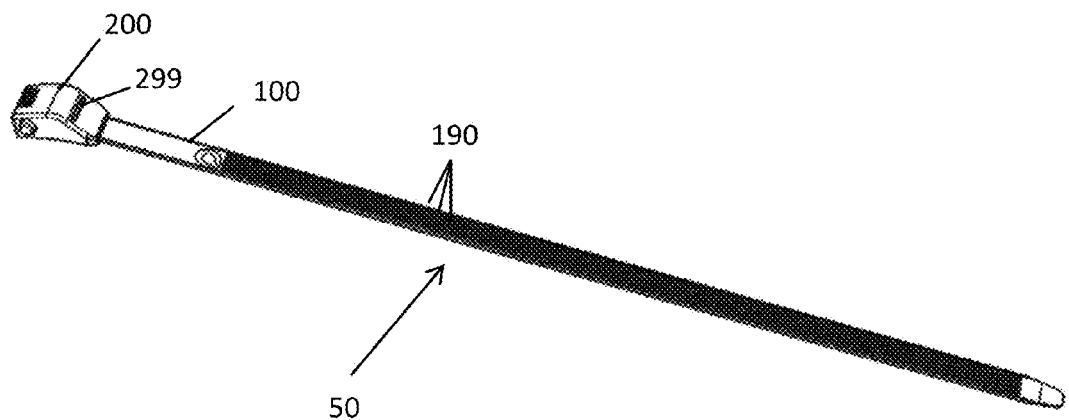
FIG. 1 depicts a view of an example band-based lock, in accordance with various embodiments.
Figure 2:
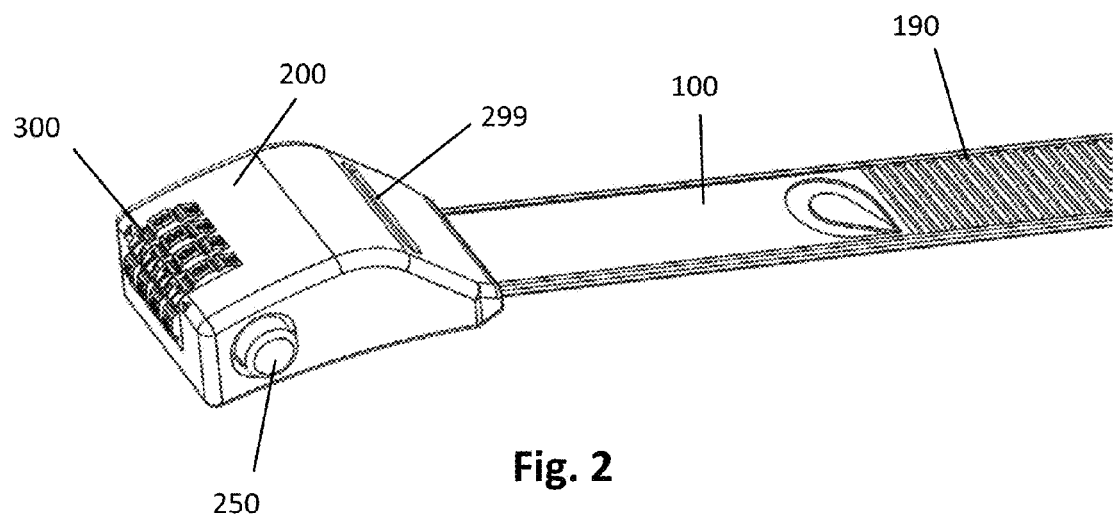
FIG. 2 depicts a closer view of the example band-based lock, in accordance with various embodiments.

In the following detailed description, reference is made to the accompanying drawings that form a part hereof, and in which are shown by way of illustration embodiments that may be practiced. It is to be understood that other embodiments may be utilized and structural or logical changes may be made without departing from the spirit or scope of the present disclosure. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In embodiments, a band-based lock may be provided for securing equipment, such as bicycles, outdoor furniture, and the like. In various embodiments, the band-based lock may include a flexible band, which may be manipulated and disposed around equipment, such as to secure the equipment to a fixed structure, such as a bike rack, railing, or sign. In various embodiments, the flexible band may have a substantially thin profile such that the flexible band may fit more easily into tight spaces as well as being rolled into a compact loop or coil. In various embodiments, the flexible band may thus have a cross section where the band is substantially wider than it is thick. The cross-sectional width-to-thickness ratio may be chosen, in various embodiments, in order that the band may be more difficult to cut, such as using a crush-based cutting tool, than other bands or cables with a lower width-to-thickness ratio.

In various embodiments, the flexible band may include one or more outer layers which include plastic or other flexible materials. In various embodiments, the band may include one or more inner layers of flexible metal or other malleable but durable material, which may be bonded to the one or more outer layers. In various embodiments, through use of multiple inner metal layers protected by outer layers of plastic, the flexible band may be more resistant to cutting using shear-based cutting tools (such as tin snips or sheet metal shears) than single-layer bands while maintaining flexibility. In various embodiments, the flexible band may also include wires which may be disposed along the edges of the flexible band inside the flexible material. In various embodiments, through use of the wires, the flexible band may be more resistant to cutting using shear-based cutting tools (such as scissors or shears). The combination of flexible outer layers, tough inner layers, and wires along the edges may thus provide for relatively superior protection from cutting than other bands or cables which may be used in equipment locks.

In various embodiments, the band may include one or more inner layers of flexible metal or other malleable but durable material, covered with a tear resistant inner jacket, such as a para-aramid cover, for example a Kevlar® cover. In various embodiments, through use of a tear resistant inner jacket, such as a Kevlar® jacket increases the flexible band's resistance to tearing (twist and tear failure). In various embodiments, additional metal layers, may be added, for example to protect the Kevlar®. In certain embodiments, a harder layer of metal is placed directly above and below the jacketed layers. These layers shield the tear resistant inner jacket from direct contact with a shear or crush tool and first distribute the load presented by the cutting tool's face. The addition of such tear resistant layers may further enhance the security afforded by the flexible band based lock.

In various embodiments, the band-based lock may include a feed mechanism which may be durably coupled to the flexible band. The feed mechanism may include openings which may provide for the flexible band to be fed through the feed mechanism, thereby putting the flexible band in a loop from its point of coupling with the feed mechanism to where it enters the feed mechanism. In various embodiments, the feed mechanism may allow the flexible band to be fed through the feed mechanism in only one direction when the feed mechanism is in a tightening or locked position. Through such one-way feeding of the band, the feed mechanism and coupled flexible band may thereby provide for a band that can only tighten under normal circumstances. Thus, the band-based lock may be used to loop around equipment as well as fixed structures, securing the equipment to the fixed structure. In various embodiments, the feed mechanism may include a pawl including one or more teeth which may engage with teeth formed on a surface of the flexible band. Alternatively, the pawl teeth may be replaced with a textured surface and the teeth on the band be replaced with a flat or textured traction surface. The pawl may grip the bands surface by impressing its textured feature into it and downward force generating friction. Through disposition of the pawl to move in only one direction when the feed mechanism is in its tightening position, the feed mechanism may thus allow the flexible band to move through the feed mechanism in one direction.

The feed mechanism may provide a facility for being placed in a release position, such as through unlocking of a locking mechanism. When the feed mechanism is in the release position, the feed mechanism may allow the flexible band to be fed backward through the feed mechanism and ultimately released from the feed mechanism, thus opening the loop and allowing for the band-based lock to be removed from securing equipment and/or placed in a position for use.

FIG. 1 depicts an example view of a band-based lock 50. In various embodiments, the band-based lock 50 may include a flexible band 100 which may be coupled to a feed mechanism 200, for example securely coupled. The flexible band 100 may be coupled to the feed mechanism 200 in various manners such that the flexible band 100 may not easily be removed, pried, or cut away from the feed mechanism 200, as may be understood. In various embodiments, the flexible band 100 may project from the feed mechanism 200 such the flexible band 100 may be bent or otherwise manipulated around equipment and/or fixed structures and then back to the feed mechanism 200. In various embodiments, the feed mechanism 200 may include a plurality of openings through which the flexible band 100 may be fed to engage with the feed mechanism 200. In the example of FIG. 1, the flexible band 100 may be fed into the feed mechanism 200 through an entrance opening (illustrated below) on the bottom portion of the feed mechanism 200 and then fed out of the exit opening 299, thereby creating a loop for securing equipment, as described above. In various embodiments, the flexible band 100 may have one or more teeth 190 disposed on its surface, such as the upper surface while the lower surface remains smooth, or substantially so. These teeth 190 may be disposed such that, when the flexible band 100 is fed through the feed mechanism 200, the teeth 190 may engage with teeth on a pawl of the feed mechanism 200. The feed mechanism 200 may then be configured such that, when the feed mechanism 200 is in a tightening position, the pawl may allow for feeding of the flexible band 100 in only one direction, thus preventing the flexible band 100 from being removed from the feed mechanism 200. As illustrated in FIG. 1, the teeth 190 may be disposed on a surface of the flexible band 100 which may face toward the center of the feed mechanism 200 when the flexible band 100 is looped and fed into the entrance opening of the feed mechanism 200, thus providing for easier engagement with structures in the feed mechanism 200. In alternative embodiments, however, the teeth 190 may be disposed on an opposite surface of the flexible band 100 and/or on both surfaces of the flexible band 100, or may be absent as noted above.

Figure 16:
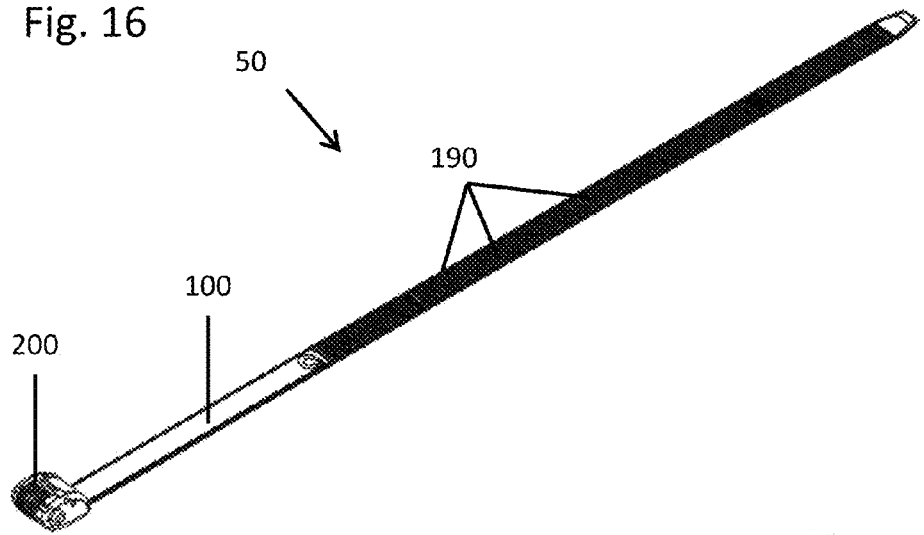
FIGS. 16-18 depict various views of a band-based lock, in accordance with various embodiments.
Figure 17:
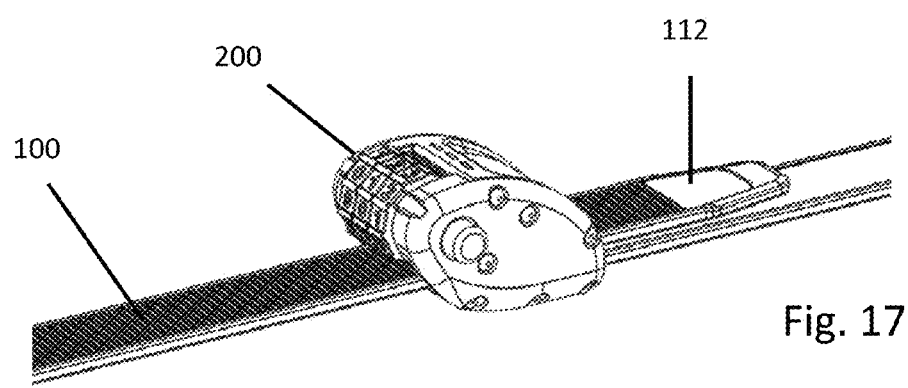
Figure 18:
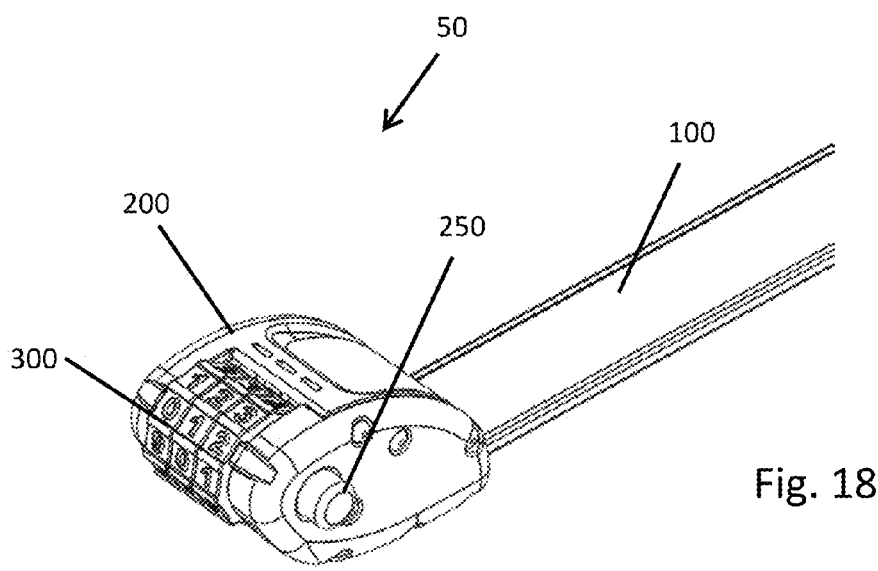

FIGS. 16-18 depict another example of a band-based lock 50. As shown in FIG. 16, in various embodiments, the band-based lock 50 may include a flexible band 100 which may be coupled to a feed mechanism 200. The flexible band 100 may be coupled to the feed mechanism 200 in various manners such that the flexible band 100 may not easily be removed, pried, or cut away from the feed mechanism 200, as may be understood. In various embodiments, the flexible band 100 may project from the feed mechanism 200 such the flexible band 100 may be bent or otherwise manipulated around equipment and/or fixed structures and then back to the feed mechanism 200. In various embodiments, the feed mechanism 200 may include a plurality of openings through which the flexible band 100 may be fed to engage with the feed mechanism 200. In various embodiments, the flexible band 100 may have one or more teeth 190 disposed on its surface, such as the upper surface while the lower surface remains smooth, or substantially so. These teeth may be disposed such that, when the flexible band 100 is fed through the feed mechanism 200, the teeth 190 may engage with teeth on a pawl of the feed mechanism 200. The feed mechanism 200 may then be configured such that, when the feed mechanism 200 is in a tightening position, the pawl may allow for feeding of the flexible band 100 in only one direction, thus preventing the flexible band 100 from being removed from the feed mechanism 200. As illustrated in FIG. 16, the teeth 190 may be disposed on a surface of the flexible band 100 which may face toward the top of the feed mechanism 200 when the flexible band 100 is looped and fed into the entrance opening of the feed mechanism 200, thus providing for engagement with structures within the feed mechanism 200. As illustrated in the example of FIG. 17, the flexible band 100 may be fed into the feed mechanism 200 through an entrance opening on the bottom portion of the feed mechanism 200 and then fed out of the exit opening also on the bottom portion of the feed mechanism 200, thereby creating a loop for securing equipment, as described above. Also shown in this view is the tail piece 112 of the flexible and band 100. It is noted that when the flexible band 100 is composed of multiple metal layers, as described below that when coiled the bottom most layers would project further because they have a shorter distance to travel being in the inside of the coil. To prevent the ends from looking uneven a tail piece can be applied to the end of the flexible band 100, for example, at the end not coupled to the feed mechanism 200. Tail piece 112 includes, internally, a space for the coiled layers to travel. In certain embodiments, tail piece 112 is molded when the metal ribbon is over coated with a outer jacket, such as a plastic outer jacket. In certain embodiments the tail piece 112 is formed or molded when the band is in a coiled position and the ends of the coiled metal ribbon have been cut to be even in the coiled position. In this way, when the band is uncoiled the inner most layers retract from the end and create a space or void into which they can slide during coiling. In certain embodiments the tail piece 112 is preformed and coupled to the end of the flexible band 100. In some embodiment, the flexible band 100 is a strap, such as webbing, for example made of synthetic fibers such as nylon, polypropylene or polyester, or exceptionally high-strength material, such as Dyneema®, and Kevlar®.

FIG. 18 depicts a closer view of the band-based lock 50 as shown in FIGS. 16 and 17. As illustrated in FIG. 18, the feed mechanism 200 may include a release button 250. In various embodiments, the release button 250, when depressed, may place the feed mechanism 200 in a release position, which may allow for the flexible band 100 to be fed through the feed mechanism 200 in the opposite direction. Thus, when the feed mechanism 200 is in the release position, the flexible band 100 may be allowed to move from the exit opening to the entrance opening on the bottom of the feed mechanism 200. In various embodiments, the feed mechanism 200 may be configured such that the release button 250 may only be depressed when a locking mechanism 300 has been unlocked. In various embodiments, the locking mechanism 300 may include locking mechanisms of various types, including combination locks (as illustrated), key-based locks, etc., as may be understood.

Figure 3:
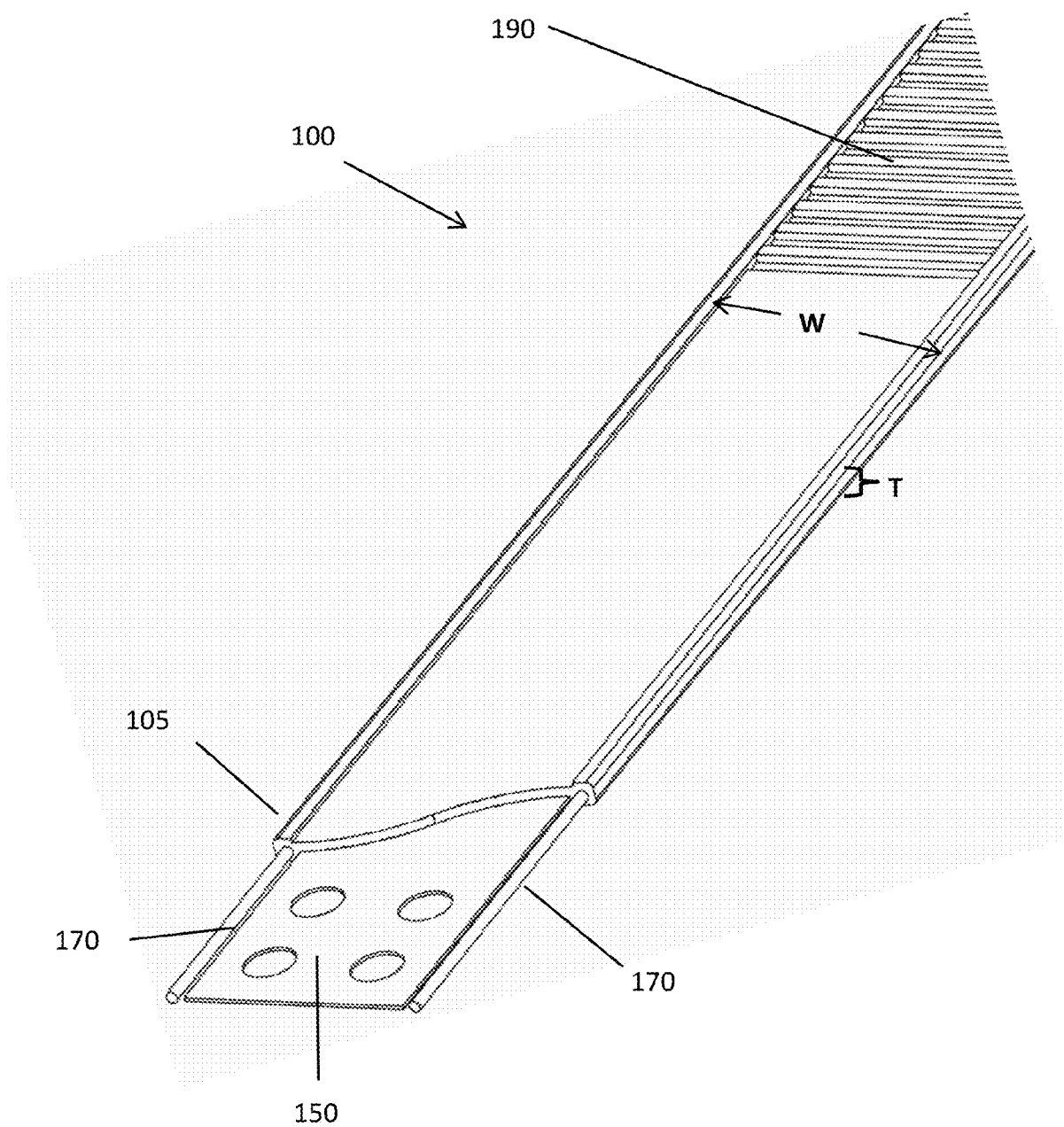
FIG. 3 depicts a cutaway view of a flexible band, in accordance with various embodiments.

FIG. 3 depicts a cutaway view of the flexible band 100. As illustrated, in various embodiments, the flexible band 100 may include a substantially thin shape, where the width of the flexible band 100 (indicated as "w" in FIG. 3) is substantially larger than the thickness of the flexible band 100 (indicated as "t" in FIG. 3). In various embodiments, through usage of a width that is substantially larger than the thickness, the flexible band 100 may provide increased protection from cutting or tearing than other cables or bands. In various embodiments, the ratio of the width to thickness of each layer of the inner metal ribbon 150 may be between 10:1 and 200:1.

In various embodiments, the flexible band 100 may include multiple layers in order to provide additional resistance to cutting or tearing. Thus, as illustrated, the flexible band 100 may include an inner metal ribbon 150, which may be disposed on the interior of the flexible band 100. In various embodiments, the inner metal ribbon 150 may be resistant to cutting, in particular by crushing tools such as bolt cutters or wire cutters. In various embodiments, the inner metal ribbon 150 may be composed of steel (such as stainless or carbon steel) or other durable and/or flexible materials, as may be understood. It may also be recognized that, in various embodiments, the term "metal" herein is used for ease of illustration and that materials other than metal, such as plastic, may be utilized, as may be understood. In various embodiments, the inner metal ribbon 150 may include multiple layers of metal material, as described below. In various embodiments, the flexible band 100 may also include one or more inner metal wires 170. In various embodiments, these inner metal wires 170 may be disposed near the edges of the flexible band 100. Such disposition of the inner metal wires 170 may prevent or otherwise discourage usage of cutting tools on the edges of the flexible band 100. In particular, the inner metal wires 170 may prevent usage of shear-based cutting tools, such as shears or scissors. The inner metal wires 170 may be single wires or composite wires, such a twisted cable.

In various embodiments, the inner metal ribbon 150 and/or inner metal wires 170 may be covered by an outer jacket 105. The outer jacket 105 may, in various embodiments, be composed of a flexible material, such as plastic, silicone and/or rubber. In various embodiments, the outer jacket 105 may also include a durable plastic or other durable material to assist in protection of the inner metal ribbon 150 and/or inner metal wires 170. In various embodiments, the outer jacket 105 is composed of a thermoplastic elastomer, for example vulcanized ethylene propylene diene monomer rubber in a thermoplastic matrix of polypropylene, for example Santoprene™. In various embodiments, the outer jacket 105 is Santoprene™, such as Santoprene 201-87, into which a 2% to 10%, for example 2%, 3%, 4%, 5%, 6%, 7%, 8%, 9%, or 10% additional polypropylene resin by mass is added during the extrusion process. For example polypropylene in pellet form is added to the Santoprene™ pellets in the extrusion input material hopper.

Figure 4:
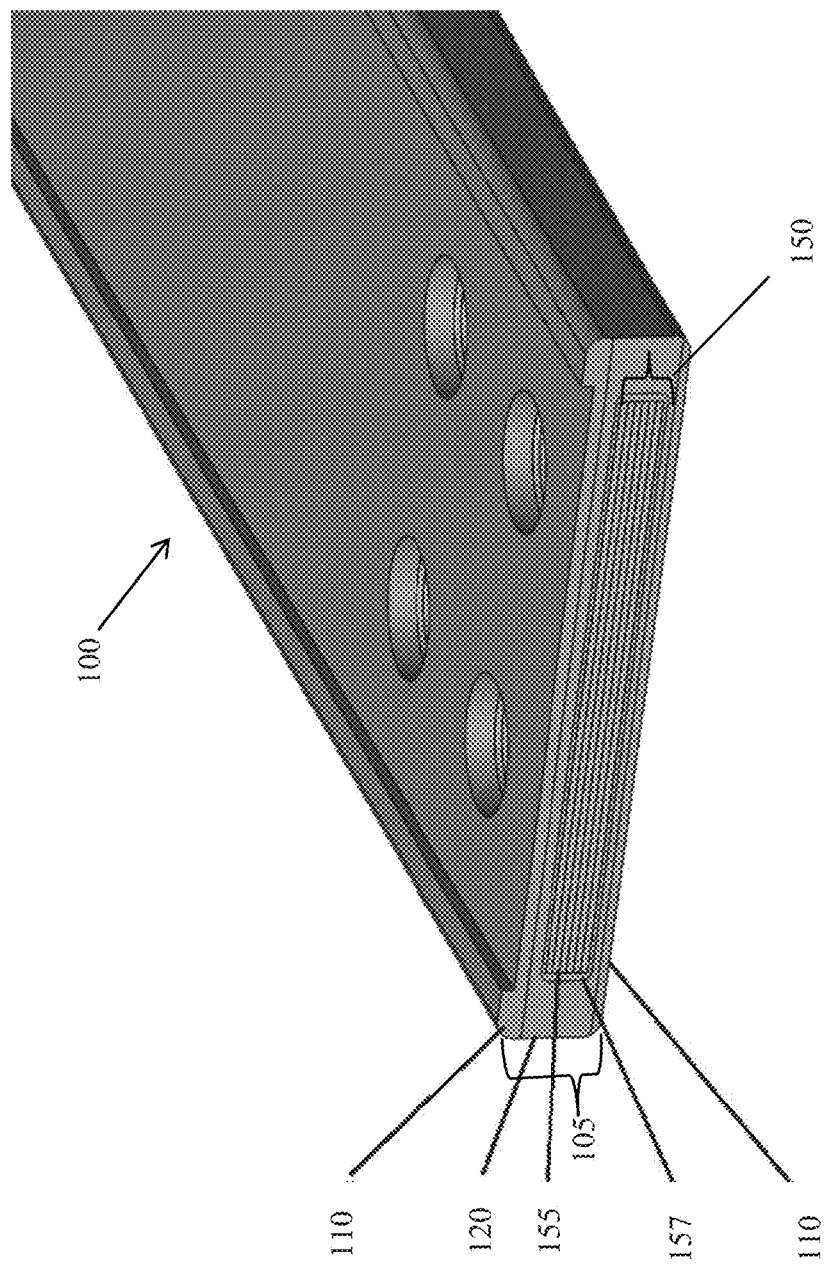
FIG. 4 depicts a perspective cross-section view of the flexible band, in accordance with various embodiments.

FIG. 4 depicts a perspective cross-section view of the flexible band 100, including various layers thereof. As illustrated in FIG. 4, in various embodiments, the outer jacket 105 may include one or more hard durable plastic layers 110, as well as a flexible plastic layer 120. It may be recognized that, in various embodiments, the term "plastic" herein is used for ease of illustration and that materials other than plastic may be utilized such as elastomers, as may be understood. In various embodiments, the flexible plastic layer 120 may be sandwiched in between the hard durable plastic layers 110, and the hard durable plastic layers 110 may not be disposed on the sides of the flexible band 100; in various embodiments, by not disposing hard plastic on the sides of the flexible band 100, the flexible band 100 may be better able to be flexed into a loop. In other embodiments, however, the hard durable plastic layer may be disposed around the sides of the flexible plastic layer 120. In various embodiments, the inner metal ribbon 150 may also include metal layers 155. In various embodiments, these metal layers 155 may not be bonded to each other, for example, so that they might slip or slide past each other. Methods of making layers of metal that slide past each other can by coating the metals and/or chilling the layer during manufacturing. By utilizing metal layers 155 which are not bonded to each other, the metal layers 155 may be allowed to slide over each other when a crushing or shear force is applied to the flexible band 100. This movement may further prevent cutting tools to be used to cut through the flexible band 100 while increasing its flexibility. In various embodiments, a metal-to-plastic bond 157 may be utilized to bond the inner metal ribbon 150 to the outer jacket 105, as may be understood.

Figure 19:
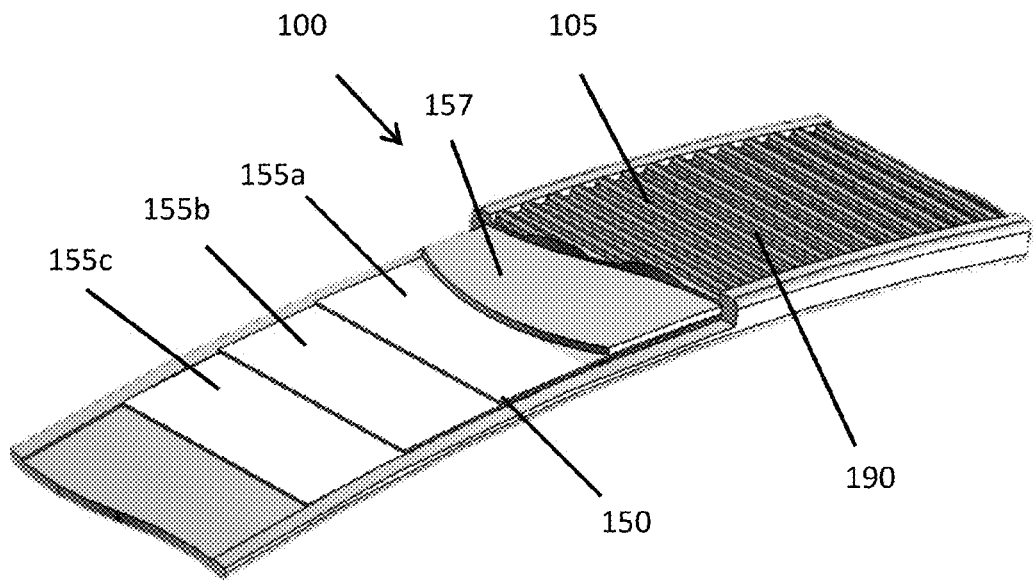
FIG. 19 depicts a cutaway view of a flexible band, in accordance with various embodiments.
Figure 20:
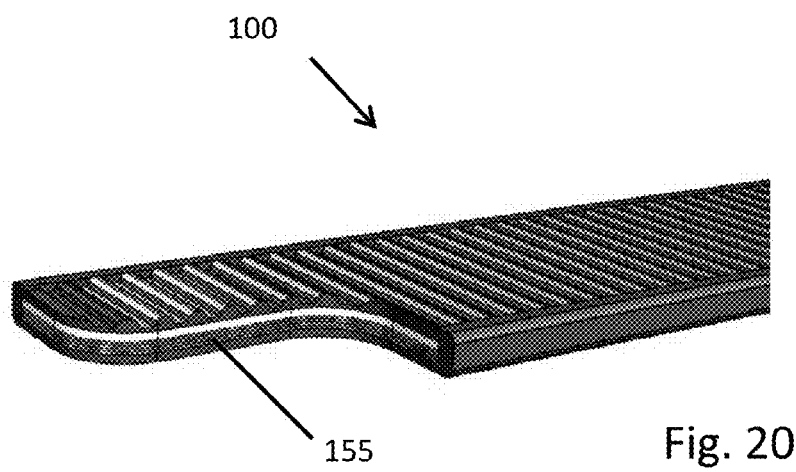
FIG. 20 depicts a cutaway view of a flexible band, in accordance with various embodiments.
Figure 21:
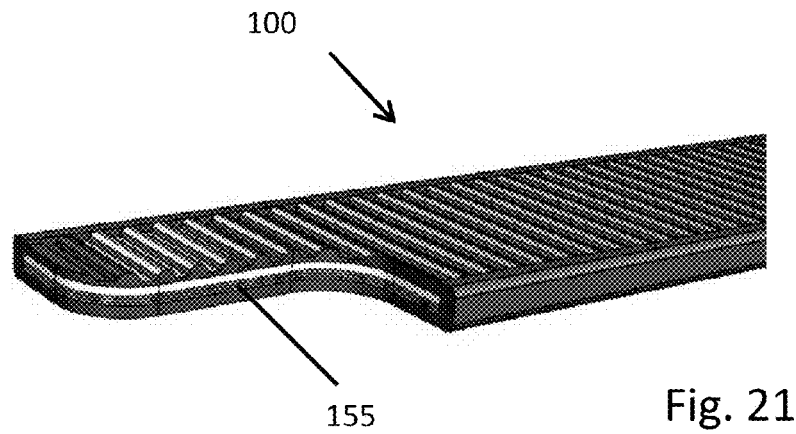
FIG. 21 depicts a cutaway view of a flexible band, in accordance with various embodiments.

FIGS. 19-21 depict various additional embodiments of the flexible band 100. With reference to FIG. 19, the metal ribbon 150 includes metal layers 155a, 155b, and 155c and a bonding layer 157 that bonds at least a portion of the top most metal layer, metal layer 155a to an interior surface of the top side of the jacket 105. In various embodiments, the bonding layer may be a thermoplastic elastomer. In certain embodiments, the bonding layer may be a vulcanized ethylene propylene diene monomer rubber in a thermoplastic matrix of polypropylene, for example Santoprene™, such as Santoprene™ TL. In certain embodiments, the bonding layer may extend laterally over only a portion of the upper surface of the top metal layer, for example between about 10% and about 100% of the surface, such as about 20%, about 25%, about 30%, about 35%, about 40%, about 45%, about 50%, about 55%, about 60%, about 65%, about 70%, about 75%, about 80%, about 85%, about 90%, about 95%, or even about 100% of the surface. In various embodiments, the metal layers 155a-155c are not bonded together and are allowed to slip or slide past each other, for example as described above. In addition to the advantages in the inhibition of being cut or sheared as described above, by using several individual layers as opposed to a single thicker metal layer the flexible band 100 is significantly more flexible and can easily be wound into a coil for storage. The internal layers, e.g., metal layers 155a-155c (for example arranged as in inner core) and the bonding layer 157 are covered with an outer jacket 105 that may include teeth 190 disposed thereon. In some embodiments, the flexible band 100 includes three or more metal layers, for example as shown in FIG. 20 (four metal layers in metal ribbon 150) and FIG. 21 (three metal layers in metal ribbon 150). In some examples, the flexible band includes an inner metal ribbon that includes at least three metal layers, for example a top metal layer, a bottom metal layer, and one or more middle metal layers, wherein the middle metal layers are not bonded to the top metal layer or the bottom metal layer. It may be advantageous to include layers of different hardness, or with different properties. For example, it may be advantageous to include harder layers as the top and or bottom metal layers of the metal ribbon, for example layers that are hardened and/or tempered to resist cutting with shearing or crushing type device. It may also be advantageous to include a layer that is less hard, for example a middle layer. The inclusion of a layer of less hard layer that is more resistant to impact, for example less brittle, may function to absorb energy from impact, for example from someone trying to crack the flexible band with a hammer or other device. By layering metals with different properties in this way a more secure band can be created. In certain embodiments, the middle metal layers and the top and/or bottom metal layers have different harnesses. In various embodiments, at least one middle metal layer has a Rockwell hardness of between about 35 C and about 45 C, such as about 37 C to about 43 C, about 39 C to about 41 C, or about 40 C. In various embodiments, a top and/or bottom metal layer has a Rockwell hardness of between about 55 C and about 65 C, such as about 57 C to about 63 C, about 59 C to about 61 C, or about 60 C. In various embodiments, the middle metal layers, the top metal layer, and the bottom metal layer may be stainless steel. In certain embodiments, the middle metal layers may be 304 stainless steel. In certain embodiments, the top metal layer and/or the bottom metal layer may be 301 stainless steel.

Figure 26:
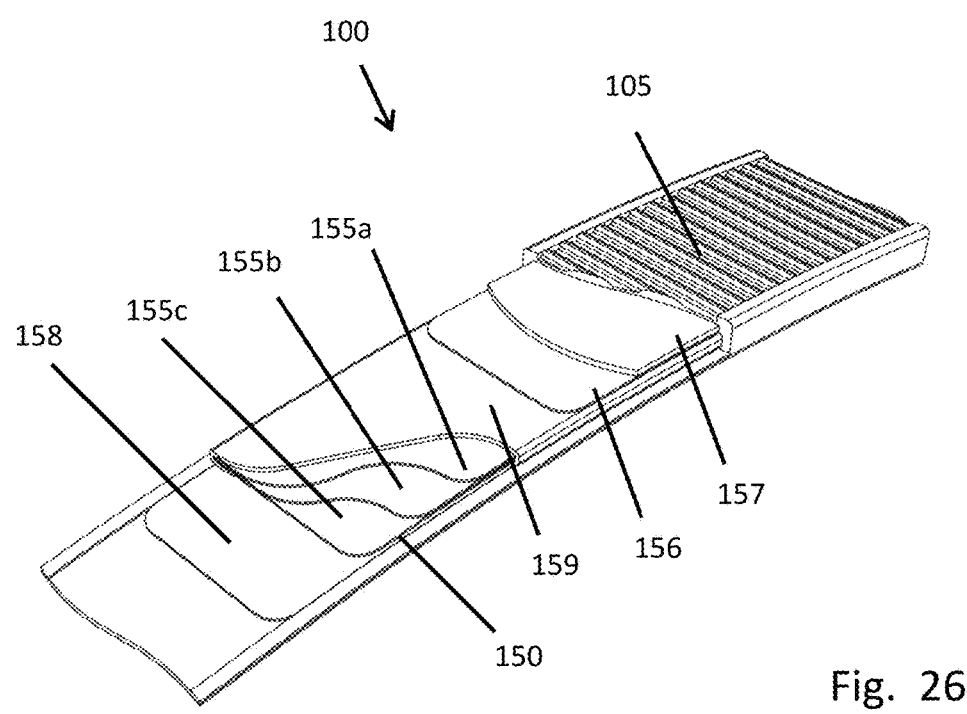
FIG. 26 depicts a cutaway view of a flexible band, in accordance with various embodiments.

FIG. 26 depicts other embodiments of the flexible band 100. With reference to FIG. 26, flexible band 100 may include an outer jacket 105. Within the outer jacket is a metal ribbon 150 that may include multiple metal layers, such as metal layers 155a, 155b, and 155c. In the embodiment shown the metal ribbon 150 is covered with a tear resistant inner jacket 159, such as a para-aramid cover, for example a Kevlar® cover. While not being bound by theory, it is believed tear resistant inner jacket 159, such as a Kevlar® jacket increases the flexible band's resistance to tearing (twist and tear failure). In embodiments, additional metal layers, 156, 158 may be added, for example to protect the Kevlar®. In certain embodiments, a harder layer of metal, such as 301 SS ribbon is placed directly above and below the jacketed layers. These layers shield the tear resistant inner jacket 159 from direct contact with a shear or crush tool and first distribute the load presented by the cutting tool's face. In embodiments, the flexible band 100 may include a bonding layer 157 that bonds at least a portion of the top most metal layer 156 to an interior surface of the top side of the outer jacket 105.

Figure 5:
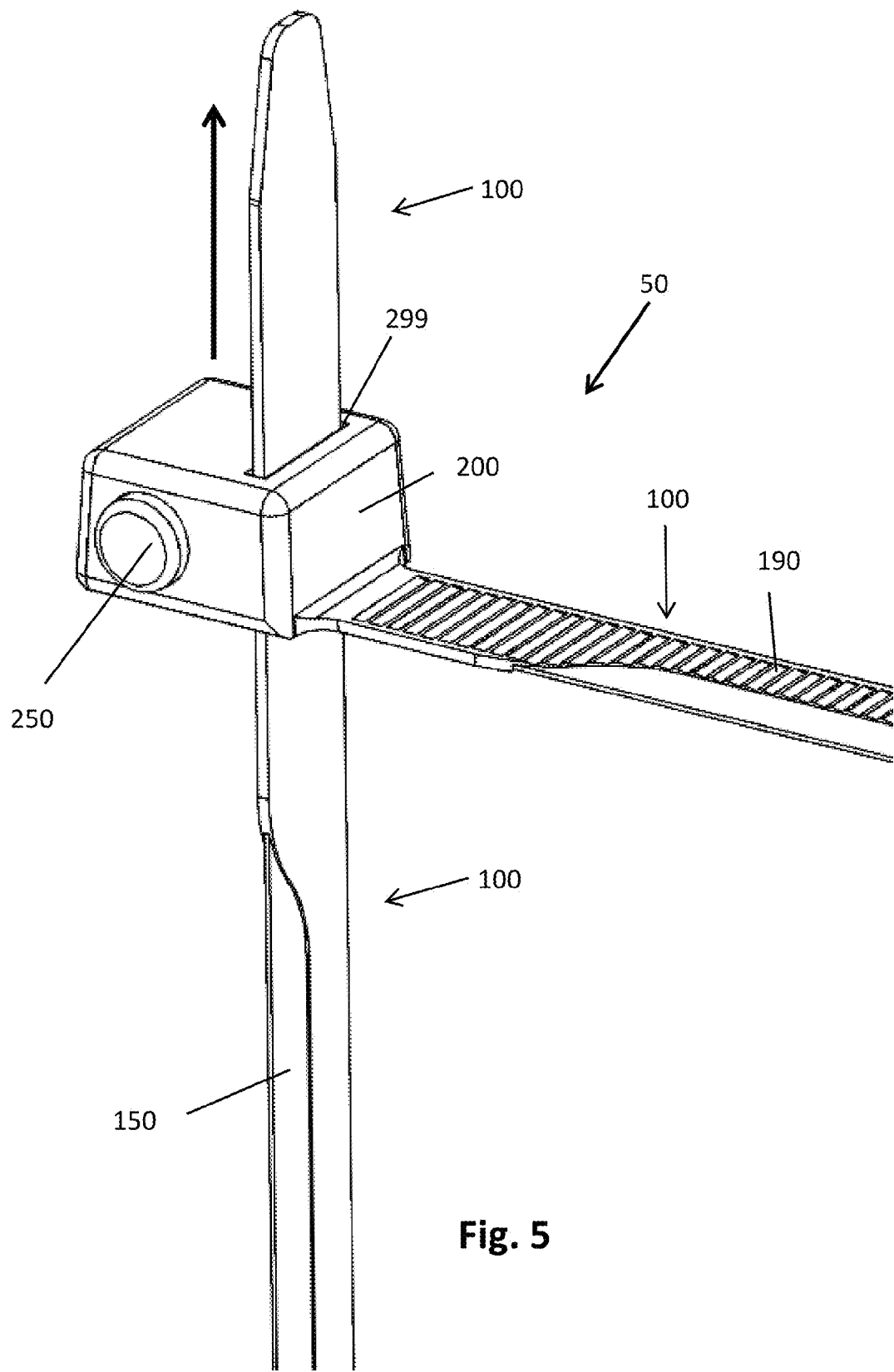
FIG. 5 depicts a view of the band-based lock when the flexible band has been inserted into a feed mechanism, in accordance with various embodiments.

FIG. 5 depicts a view of a band-based lock 50 when the flexible band 100 has been inserted into the feed mechanism 200. As illustrated, the flexible band 100 has been looped from its point of coupling 101, inserted through the entrance opening of the feed mechanism 200, and fed through to the exit opening 299 (as illustrated by the arrow). In the example of FIG. 5, the feed mechanism 200 is in a locked or tightening position, meaning that the flexible band 100 can only continue to be fed through the feed mechanism 200 in the tightening direction. Through engagement of the release button 250, the flexible band 100 may be allowed to be released from the feed mechanism 200. FIG. 5 also illustrates a cutaway of the flexible band 100, showing the inner metal ribbon 150.

Figure 6:
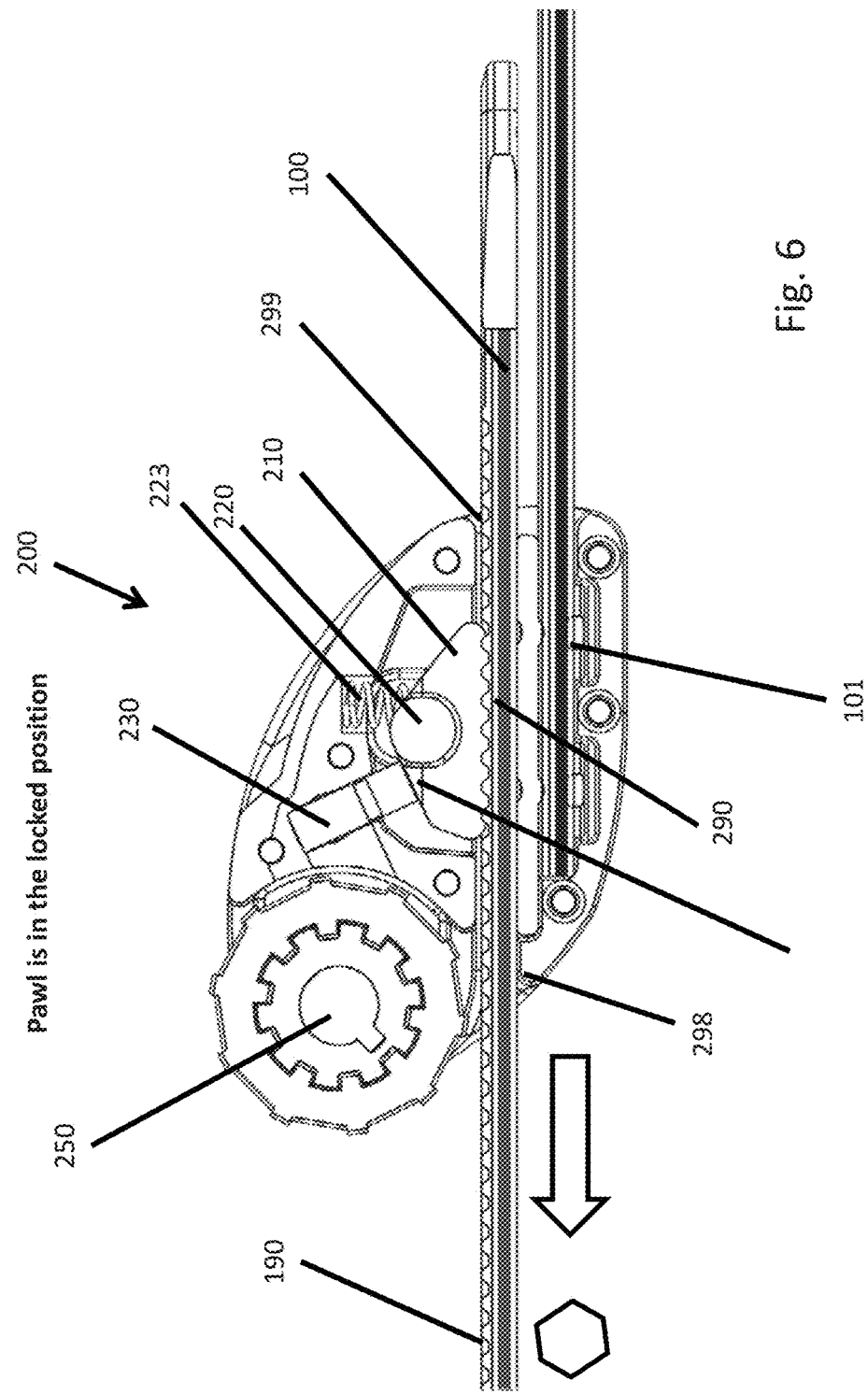
FIG. 6 depicts an example cutaway view of the feed mechanism when the feed mechanism is in a locked position, in accordance with various embodiments.

FIG. 6 depicts an example cutaway view of the feed mechanism 200 when the feed mechanism 200 is in a locked position. As illustrated in FIG. 6, in various embodiments, the feed mechanism 200 may include a housing 201, which may contain and provide support for various components of the feed mechanism 200. In various embodiments, the flexible band 100 may be coupled to the housing 201 at coupling point 101; such coupling between the housing 201 and the flexible band 100 may be accomplished according to various known techniques. In various embodiments, the housing 201 may include at least two openings, such as entrance opening 298 and exit opening 299, through which the flexible band 100 may be fed. As seen in FIG. 6, the flexible band 100 may thus form a loop using the feed mechanism 200 to hold the loop in place.

In various embodiments, the feed mechanism 200 may include a pawl 210, which may be configured to engage with the flexible band 100 and to control the direction in which the flexible band 100 may be fed through the feed mechanism 200. In various embodiments, the pawl 210 may include one or more teeth 290, which may be configured to interlock with the one or more teeth 190 of the flexible band 100. The pawl 210 may be coupled to a cam pin 220, on which the pawl 210 may swing either toward the entrance opening 298 or the exit opening 299. The feed mechanism 200 may also include a cam pin spring 223, which may be coupled between the housing 201 and the cam pin 220. By providing a force in the direction of the flexible band 100 on the cam pin 220, and thus the pawl 210, the cam pin spring 223 may help ensure that the pawl 210 is engaged with the flexible band 100 when the feed mechanism 200 is in the locked position.

The feed mechanism 200 may, in various embodiments, include a key 230, which may be disposed above the pawl inside the feed mechanism 200. In certain states of the feed mechanism 200, such as when the feed mechanism 200 in in a locked or tightening position, the key 230 may prevent movement of the pawl 210 in the direction of the entrance opening 298 (e.g., in the direction of the arrow in FIG. 6). In the locked position illustrated in FIG. 6, the key 230 is so disposed, keeping the pawl 210 from swinging toward the entrance opening 298. The flexible band 100 is thus prevented from being fed backward through the feed mechanism 200, allowing the band-based lock 50 to act as a lock for whatever equipment the flexible band 100 is looped around. The band cannot be pulled to the left. Pawl motion is stopped by key contacting the ramp.

Figure 7:
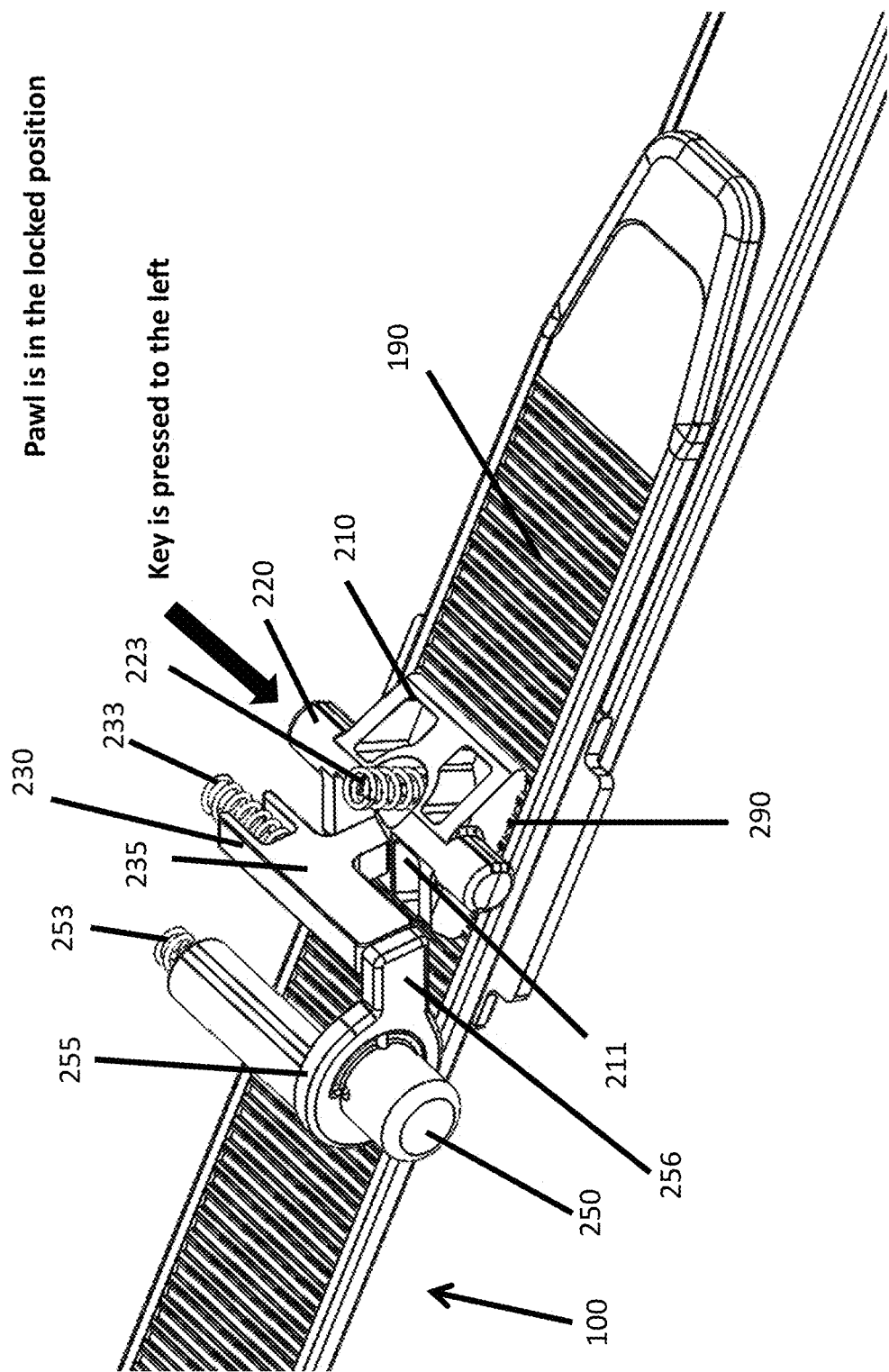
FIG. 7 depicts a perspective view of example components of the feed mechanism when the feed mechanism is in the locked position, in accordance with various embodiments.

FIG. 7 depicts a perspective view of components of the feed mechanism 200 when the feed mechanism 200 is in the locked position. As illustrated in FIG. 7, a key spring 233 may be disposed between the key 230 and the housing 201 (not illustrated in FIG. 7) to keep the key 230 in place. In particular, action of the key spring 233 may keep the key 230 disposed against a release tab 256. The release tab 256 may project from a release collar 255 which may, in turn, be coupled to the release button 250. The release button 250 may be coupled to a release spring 253, which may be disposed between the release button and the housing 201. The release button 250 may thus be maintained in an extended state by the release spring when the feed mechanism 200 is in a locked position. This extended position of the release button 250 may prevent the release tab 256 from engaging the key 230 and pushing it out of its naturally-disposed position as a result of action from the key spring 233 without further action by a user.

In various embodiments, the key 230 may include a key post 235 which may be disposed to couple with a pawl ramp 211 of the pawl 210. The pawl ramp 211 may be a sloping portion of the pawl 210; in various embodiments, the pawl ramp 211 may end in a cutout portion of the pawl 210, which is discussed below. In the locked position of FIG. 7, the key post 235 may be propped against the pawl ramp 211 of the pawl 210, preventing the pawl 210 from swinging toward the entrance opening 298 (not illustrated in FIG. 7). The angled engagement of the key post 235 and pawl ramp 211 may cause the pawl to be pressed into the flexible band surface as the band 100 is pulled toward opening 298. This may prevent the flexible band 100 from being fed backward through the feed mechanism 200, as discussed above.

Figure 8:
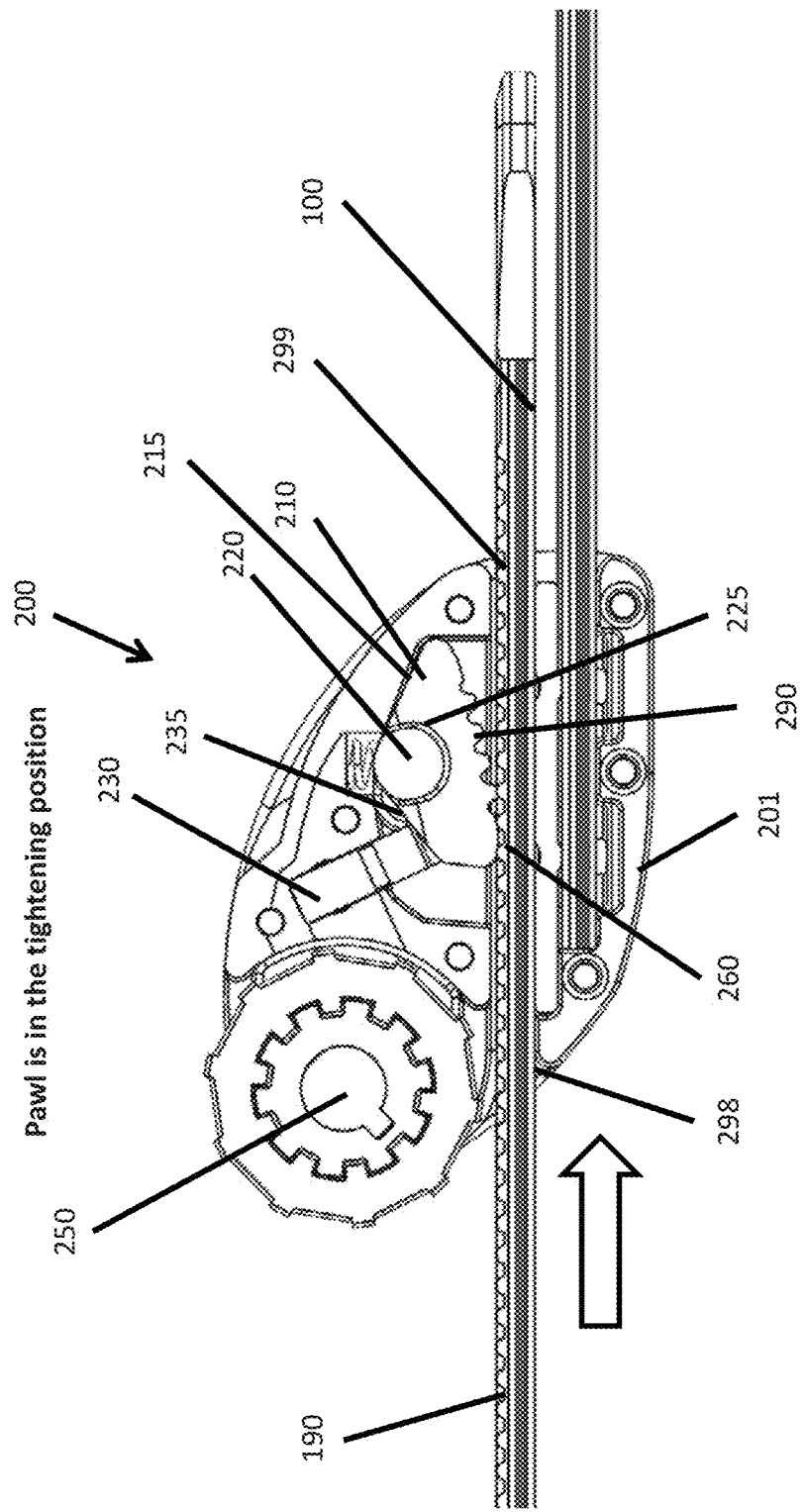
FIG. 8 depicts a cutaway view of the feed mechanism when the feed mechanism is in a tightening position, in accordance with various embodiments.

FIG. 8 depicts a cutaway view of the feed mechanism 200 when the feed mechanism 200 is in a tightening position. In the example of FIG. 8, the flexible band 100 is being pulled, such as by a user of the band-based lock 50, to feed the flexible band 100 through the entrance opening 298 and out through the exit opening 299. This action of the flexible band 100 against the pawl 210 may cause the pawl 210 to swing up and toward the exit opening 299, as illustrated. The movement of the pawl 210 may be limited due to collision with a right frame stop 215 which may project from the housing 201 in a position such as to limit a right portion of the top of the pawl 210 from moving too far up. The movement of the pawl 210 may also be limited due to collision with a right stop 225, which may be a right edge of a cutout in an inner shell of the housing 201. The cam pin 220 may rest against this right edge 225, thus preventing continued movement of the cam pin 220 (and thus of the pawl 210) in the direction of the exit opening 299.

As FIG. 8 also illustrates, in various embodiments, when the feed mechanism 200 is in a tightening position and the pawl 210 has swung toward the exit opening 299, the teeth 290 of the pawl 210 may disengage from the teeth 190 of the flexible band 100. A left pawl heel 260 of the pawl 210 may then rest against the teeth 190 of the flexible band 100. In various embodiments, the left pawl heel 260 may not include teeth, and thus may not engage the teeth 190 of the flexible band 100 reducing tooth wear. This lack of engagement may allow for further feeding of the flexible band 100 through the feed mechanism 200 in the direction of the arrow, and thus further tightening of the loop made by the flexible band 100. It may be noted that, when the feed mechanism 200 is in this tightening position, an attempt at feeding the flexible band 100 backward through the feed mechanism 200 (e.g., toward the entrance opening 298) may cause the pawl 210 to swing back down until it rests against the key 230. Once stopped in this position (which may be the locked position discussed above) the teeth 290 of the pawl 210 may re-engage with the teeth 190 of the flexible band 100. This may prevent loosening of the loop of the band-based lock 50 when the feed mechanism 200 remains locked. Key is in the locked position. The band is pulled to the right. The pawl is free to move to the right away from the key. The cam pin contacts the right stop, rotating the pawl. This frees the teeth. The pawl rests on the frame stop and the pawl heel allowing the band to slide freely.

Figure 9:
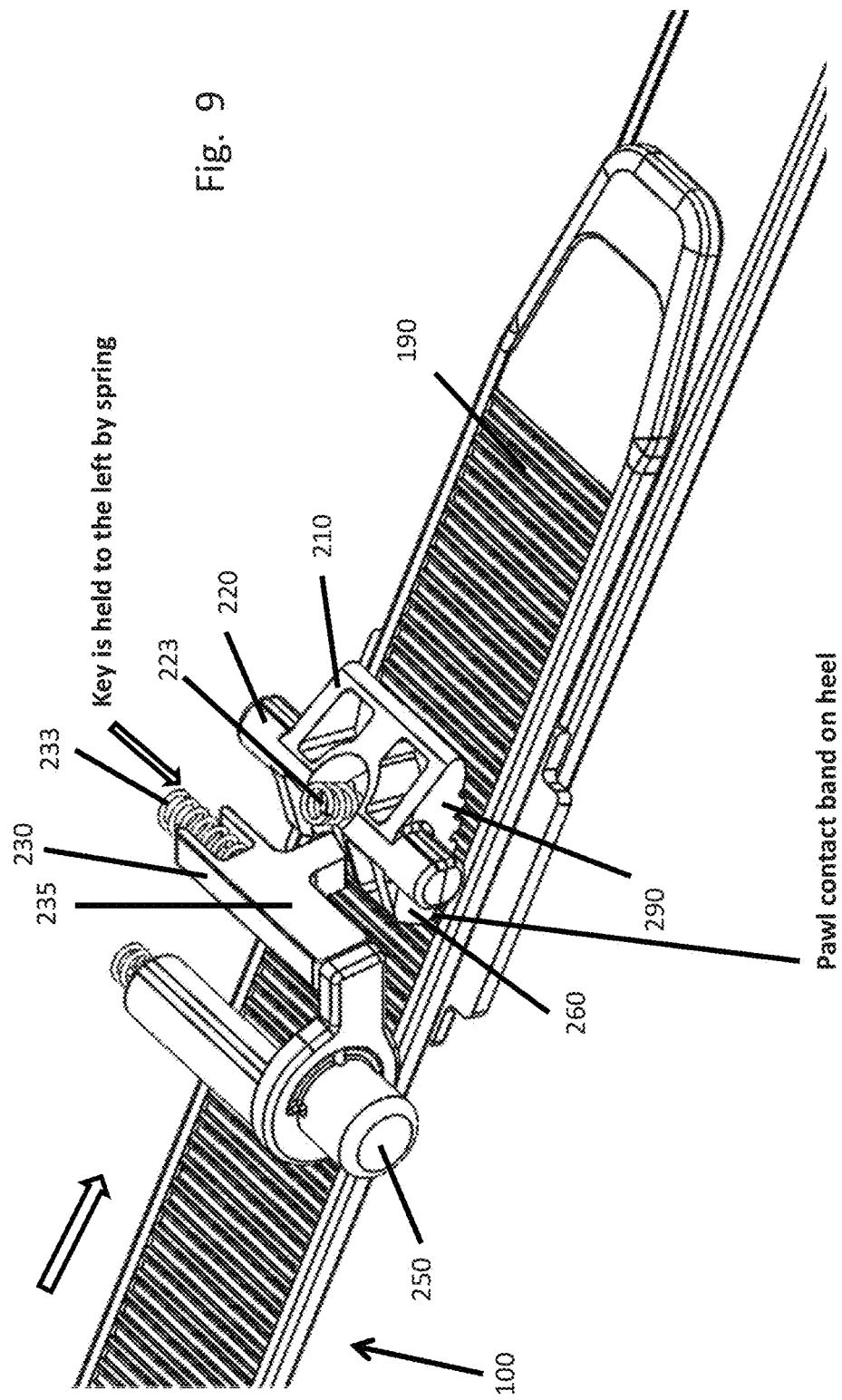
FIG. 9 depicts a perspective view of components of the feed mechanism when the feed mechanism is in the tightening position, in accordance with various embodiments.

FIG. 9 depicts a perspective view of components of the feed mechanism 200 when the feed mechanism 200 is in the tightening position. As illustrated in FIG. 9, when the flexible band is fed through in the direction of the arrow, the pawl 210 may be pulled along and away from the key 230 (and in particular from the key post 235). The key 230 and release button 250, however, may maintain the same respective positions as they may hold when in the locked position. FIG. 9 also further illustrates how the teeth 290 of the pawl 210 may be pulled away from the teeth 190 of the flexible band 100, allowing the flexible band 100 to be pulled through the feed mechanism 200 and the band-based lock 50 to be tightened. When the band is pushed to the right, the pawl translates and rotates away from the key.

Figure 10:
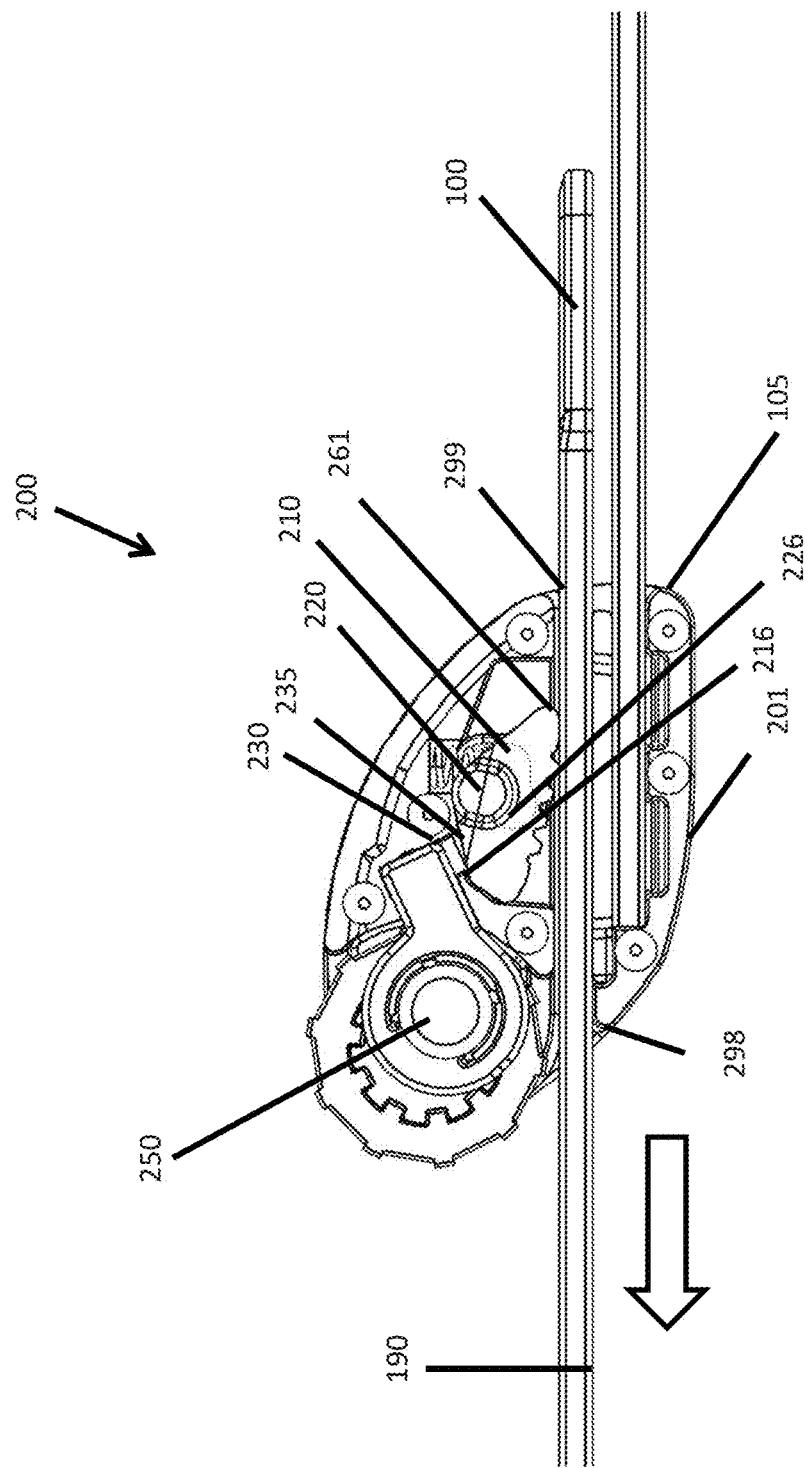
FIG. 10 depicts a cutaway view of the feed mechanism when the feed mechanism is in a release position, in accordance with various embodiments.

FIG. 10 depicts a cutaway view of the feed mechanism 200 when the feed mechanism 200 is in a release position. In FIG. 10, the release button 250 has been pushed in the forward direction (e.g. into the feed mechanism 200 through the center of the release button 250). In this position, the release button may cause the key 230 to be moved out of the way of the pawl 210. Particular examples of the interaction between the key 230 and the pawl 210 when in the release position are described below with reference to FIG. 11. With the key 230 (and in particular the key post 235) moved out of the way of the pawl 210, the pawl 210 is free to swing toward the entrance opening 298 of the feed mechanism 200. Thus, if the flexible band 100 is fed backward (e.g., from the exit opening 299 to the entrance opening 298), the pawl 210 may then swing toward the entrance opening 298, as illustrated in FIG. 10. The movement of the pawl 210 may be limited in the release position due to collision with a left frame stop 216, which may project from the housing 201 in a position such as to limit a left portion of the top of the pawl 210 from moving too far up. The movement of the pawl 210 may also be limited due to collision with a left stop 226, which may be a left edge of the cutout in the inner shell of the housing 201. The cam pin 220 may rest against this left edge 225, thus preventing continued movement of the cam pin 220 (and thus of the pawl 210) in the direction of the entrance opening 298.

As FIG. 10 also illustrates, in various embodiments, when the feed mechanism 200 is in its release position and the pawl 210 has swung toward the entrance opening 298, the teeth 290 of the pawl 210 may again disengage from the teeth 190 of the flexible band 100. A right pawl heel 261 of the pawl 210 may then rest against the teeth 190 of the flexible band 100. In various embodiments, the right pawl heel 261 may also not include teeth, and thus may not engage the teeth 190 of the flexible band 100 reducing tooth wear. This lack of engagement may allow for further feeding of the flexible band 100 through the feed mechanism 200 in the direction of the arrow, and thus further loosening of the loop made by the flexible band 100. If the flexible band 100 is continued to be fed in this direction, the flexible band 100 may be fed entirely through the feed mechanism 200 until it is removed from the feed mechanism 200, thus causing release of the loop created by the flexible band 100. The push button contacts key and both slide into the page. The key no longer contacts ramp. The band is pulled to the left. The pawl is free to slide to the left until the cam pin contacts the left stop. The pawl tips, lifting itself on the pawl heel. This disengages the teeth. The pawl rotates until the frame stop is contacted.

Figure 11:
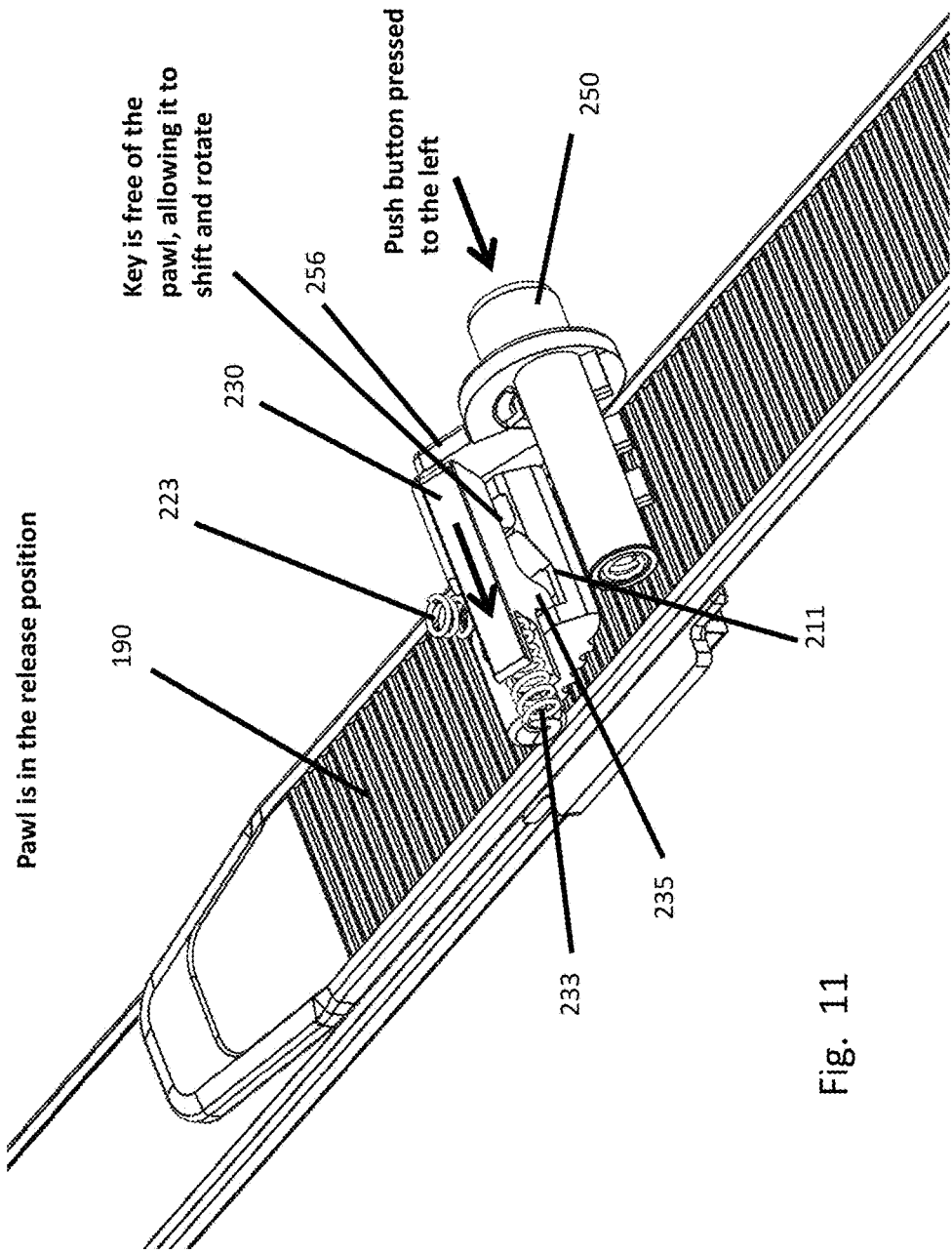
FIG. 11 depicts a perspective view of components of the feed mechanism when the feed mechanism is in the release position, in accordance with various embodiments.

FIG. 11 depicts a perspective view of components of the feed mechanism 200 when the feed mechanism 200 is in the release position. As illustrated in FIG. 11, when the release button is pushed in (e.g., in the direction of the arrows), the release tab 256 may be moved the same direction. The release tab 256 may then move the key 230 against the force of the key spring 233. This movement may, in turn, move the key post 235 away from the pawl ramp 211 to its cutout end, where the key post 235 no longer has contact with the pawl ramp 211. In this position, the key post 235 may not contact the pawl 210 and the pawl 210 may no longer be prevented from swinging up toward the key 230 (and thus toward the entrance opening). As discussed above, the flexible band 100 may then be pulled backward through the feed mechanism 200, and the band-based lock 50 may be loosened/released.

FIGS. 22A and 22B depict various views of an example locking mechanism 300 and release button 250. As illustrated in FIGS. 22A and 22B, release collar 255 may be coupled to the release button 250 though tabs 252. The tabs 252 are slightly tapered and fit within the hole present in release collar 255 having like shaped tapers. When the locking mechanism 300 is in the locked position, release collar 255 is not able to slide and unlock the lock. By using a release button 250 that engages, and disengages, with the release collar 255 through though tabs 252, the release button acts as a theft preventative. As extreme pressure is applied to the release button 250 when the locking mechanism is in the locked position the tabs 252 deform such that the entire button slides into the space behind the release collar 255. Thus, if someone were to try to force the lock open, for example by striking the release button 255 with a hammer, or other instrument, the button would detach an move behind the release collar 255 thus preventing the feed mechanism from moving to an unlocked position.

Figure 23A:
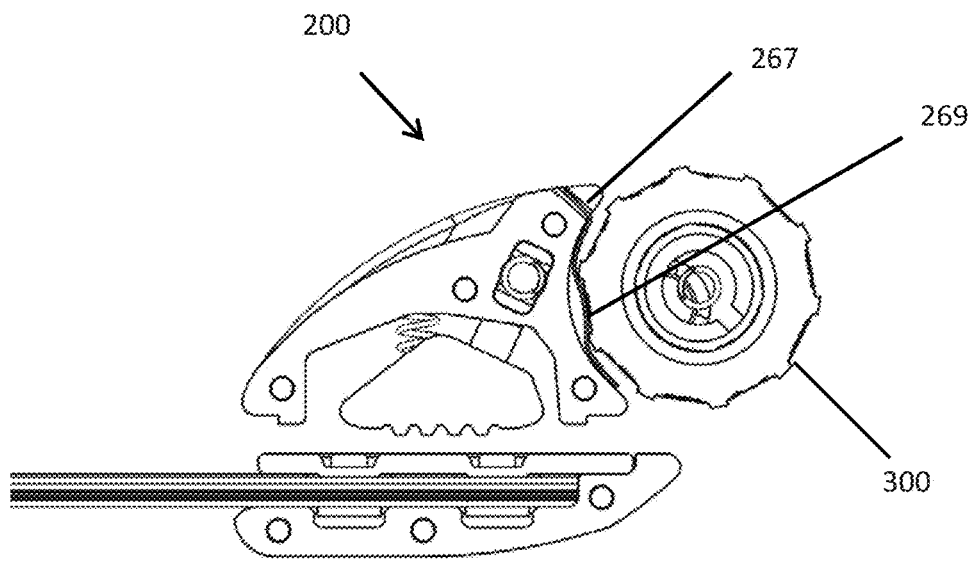
FIGS. 23A and 23B depict cutaway views of the feed mechanism, in accordance with various embodiments.
Figure 23B:
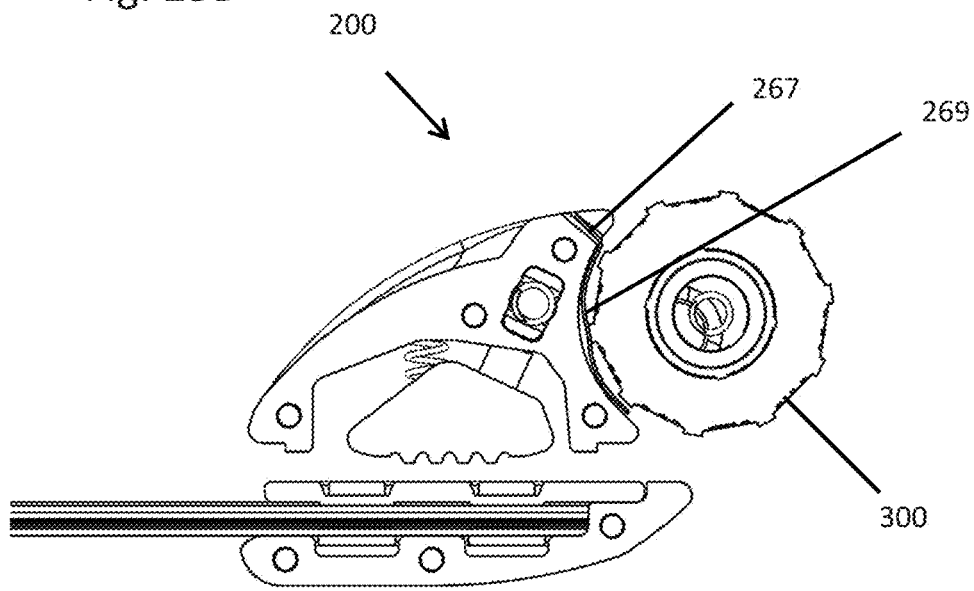

FIGS. 23A and 23B depict side cut away views of the feed mechanism 200 showing the movement of indexing spring 267 as a result of rotation of locking mechanism 300. Indexing spring 267 is coupled to the feed mechanism 200, such as to the housing, and includes a protrusion 269 that fits within indentations in the locking mechanism 300. As the locking mechanism is rotated, the protrusion 269 is depressed and then releases into another indentation once the desired degree of rotation is reached. In this way the correct position to unlock the feed mechanism 200 can be easily reached and maintained.

Figure 24:
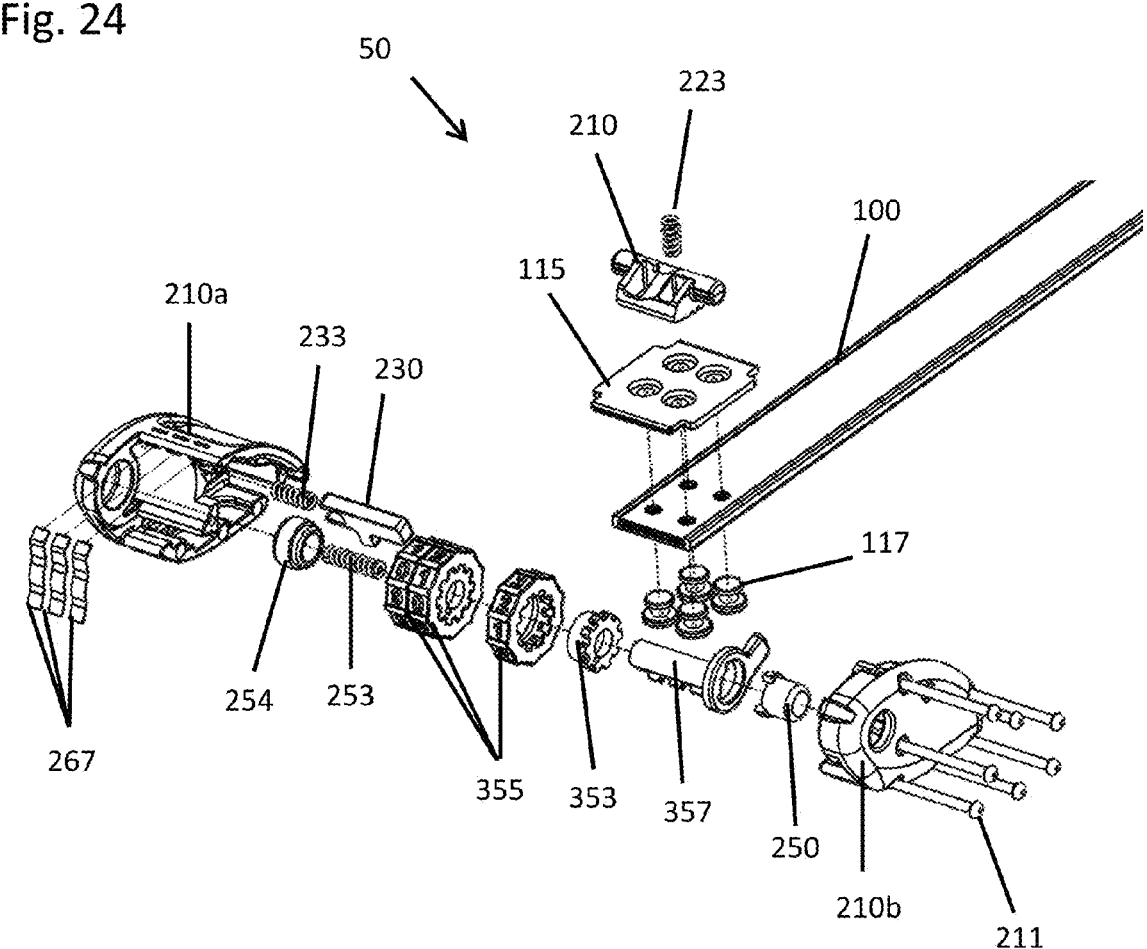
FIG. 24 depicts an exploded view of a band-based lock, in accordance with various embodiments.

FIG. 24 depicts an exploded view of an embodiment of a band-based lock 50. Shown are the various components as described above. In addition, housing 210a, 210b is shown as two pieces and is coupled with fasteners 211. Also shown is plate 115 and fasteners 117 for coupling the flexible band 100 to the housing 210a, 210b. In addition, release button retainer 254 is shown. Individual components of the locking mechanism are also shown, including rotating cams 353, grooved pin 357, and combination selectors 355.

Figure 25:
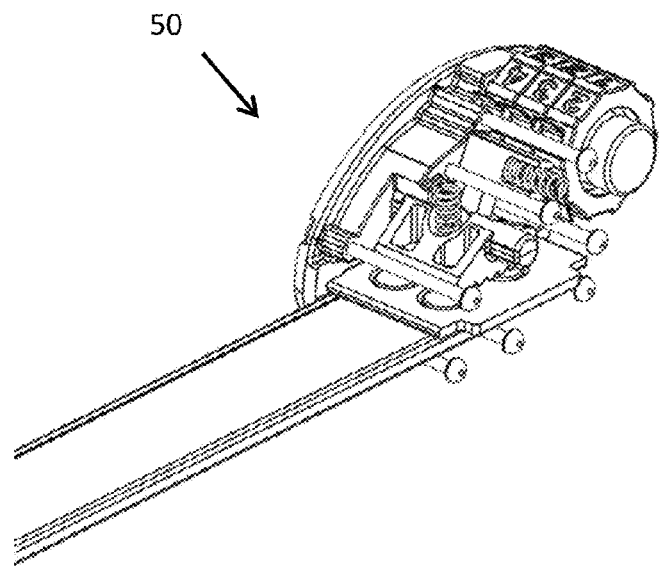
FIG. 25 depicts an assembled band-based lock, in accordance with various embodiments.

FIG. 25 depicts the assembled band-based lock 50 of FIG. 24.

In accordance with various embodiments, the width and thickness ratios discussed herein were tested for durability and cutting/tearing resistance. FIGS. 12-15 are charts showing the impact and importance of various aspects of the band based locks.

Figure 12:
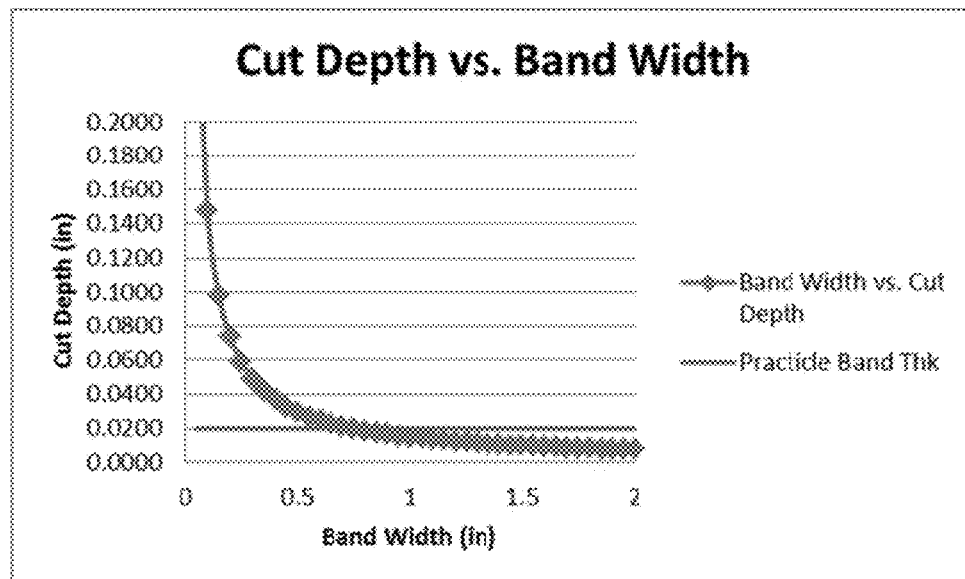
FIGS. 12-15 are charts showing the impact and importance of various aspects of the band based locks.

FIG. 12 illustrates cut depth v. band width. Cut depth is defined as the depth 36" bolt cutters are capable of cutting into a band layer. The chart varies by band width. As the band width increases the depth the cutters are able to penetrate reduces. Thus, in an embodiment, a suitable band width is greater than 0.5" to defeat 36" bolt cutters.

Figure 13:
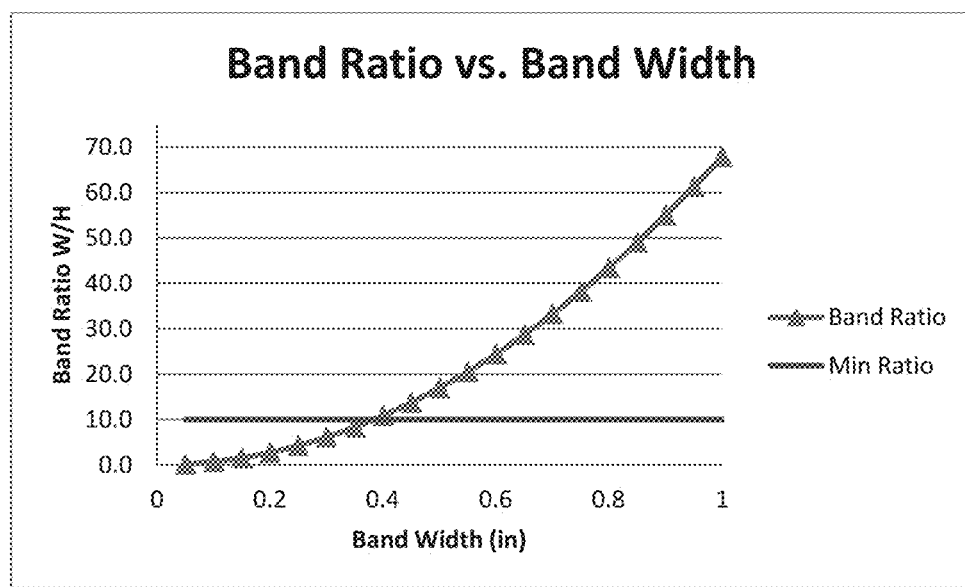

FIG. 13 illustrates band ratio v. band width. This is the ratio of band layer thickness to band width. The line marked with triangles represents the ratios at which a 36" bolt cutter would be able to just penetrate the layer.

Figure 14:
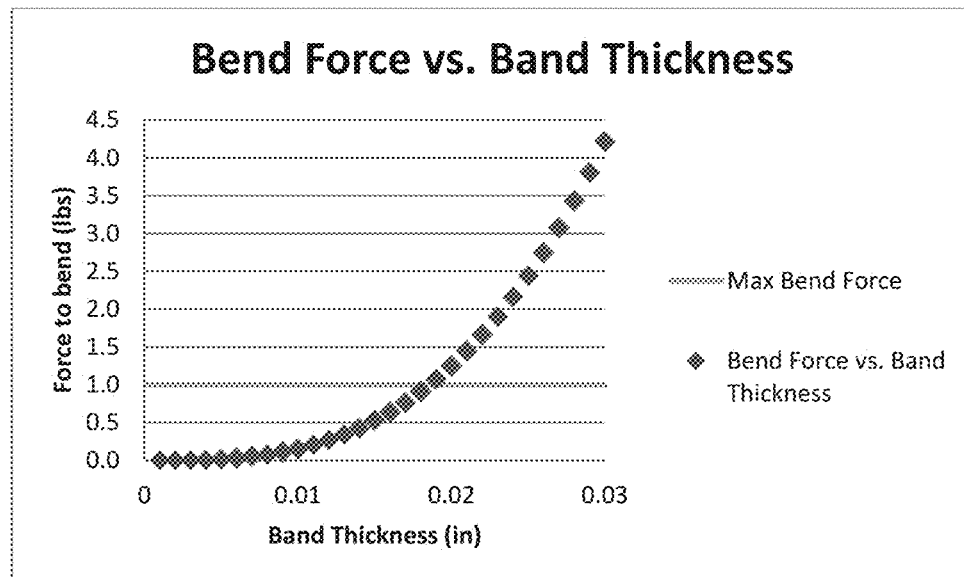

FIG. 14 illustrates bend force v. band thickness. This chart represents the force required to bend 6" of band 90 degrees. As the band layer gets thicker the user must exert more force to coil the band.

Figure 15:
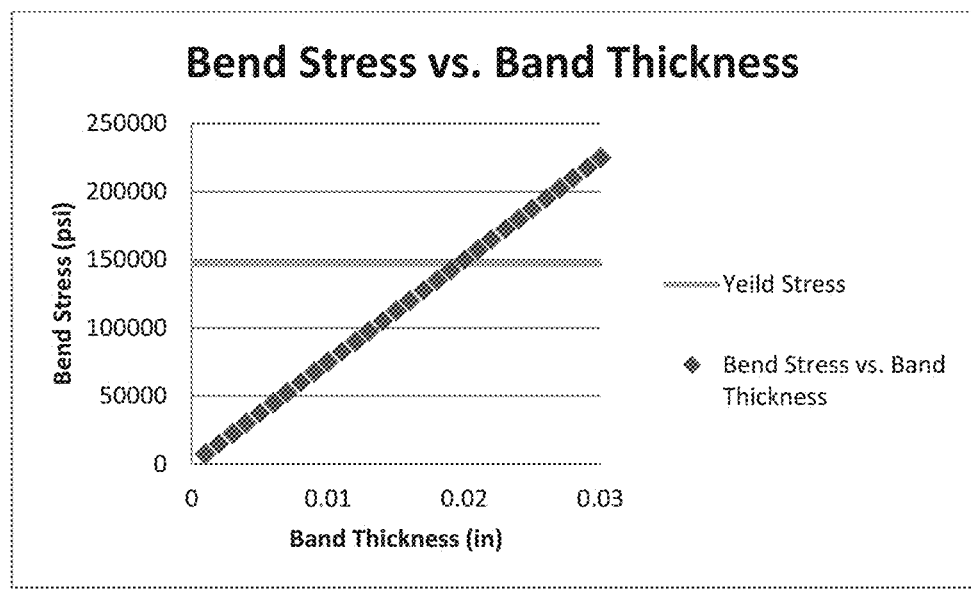

FIG. 15 illustrates bend stress v. band thickness. This chart represents the internal stress created when a 6" section of band is bent 90 degrees. As the band layer gets thicker, more stress in induced in the band. The yield stress of the material is defined using the straight line. Any stress above this line will permanently deform the band. As such, in embodiments, each layer of steel band should be less than 0.020" thick. This enables the bending stress to remain below the material's yield strength when coiled. Such thickness also prevents the user from having to exert a large amount of effort to coil the band in their hand.

The invention claimed is:

1. A flexible band for use in a band-based lock, comprising:

an inner metal ribbon comprising three or more stacked layers of metal including a top metal layer, a bottom metal layer, and one or more middle metal layers, wherein each layer of the three or more stacked layers of metal has a width to thickness ratio between 10:1 and 200:1, wherein at least one middle layer of the one or more middle metal layers consists of a first hardness having a Rockwell hardness of between about 35 C and 45 C, and the top and/or bottom metal layers consist of a second, different hardness, and wherein the three or more stacked layers of metal are not bonded to each other to permit sliding of the three or more stacked layers of metal with respect to each other;

one or more inner jackets surrounding the three or more stacked layers of metal, wherein the one or more inner jackets comprise a tear resistant material; and an outer jacket surrounding the one or more inner jackets, wherein the outer jacket comprises plastic, silicone, and/or rubber.

2. The flexible band of claim 1, wherein at least one of the top metal layer or bottom metal layer has a Rockwell hardness of between about 55 C and 65 C.

3. The flexible band of claim 1, wherein the one or more middle metal layers, the top metal layer and the bottom metal layer comprise stainless steel.

4. The flexible band of claim 1, wherein the outer surface of the outer jacket has an upper face and a lower face, and wherein the lower face is substantially smooth and the upper face comprises teeth disposed thereon.

5. The flexible band of claim 1, wherein the outer jacket comprises vulcanized ethylene propylene diene monomer rubber in a thermoplastic matrix of polypropylene.

6. A flexible band-based lock system, comprising: a feed mechanism, comprising:
a housing; and
a locking mechanism disposed within the housing and having a locked and unlocked position; and
the flexible band according to claim 1, wherein the flexible band further comprises a first end and a second end and wherein the flexible band is coupled to the feed mechanism at the first end.

7. The flexible band-based lock system of claim 6, wherein the feed mechanism comprises an entrance opening through which the second end of the flexible band can be fed to engage with the locking mechanism of the feed mechanism.

8. The flexible band-based lock system of claim 6, wherein the flexible band has an upper surface and a lower surface and wherein the upper surface comprises one or more teeth disposed thereon.

9. The flexible band-based lock system of claim 6, wherein the feed mechanism comprises a pawl that allows for feeding of the flexible band in only one direction, thus preventing the flexible band from being removed from the feed mechanism.

10. The flexible band-based lock system of claim 6, further comprising a release button, that, when depressed, places the feed mechanism in a release position allowing for the flexible band to be fed through the feed mechanism in an opposite direction.

11. The flexible band-based lock system of claim 10, wherein the release button is depressible when the locking mechanism is in the unlocked position.

12. The flexible band-based lock system of claim 10, wherein the release button comprises a deformable structure that deforms in response to excessive pressure when the lock mechanism is in the locked position.

13. The flexible band of claim 1, further comprising a wire disposed within the outer jacket and running along an edge of the flexible band adjacent to the inner metal ribbon.

14. The flexible band of claim 1, wherein the tear resistant material comprises a para-aramid material.

15. A flexible band for use in a band-based lock, comprising:
an inner metal ribbon comprising two or more layers of metal, wherein each layer of the two or more layers of metal has a width to thickness ratio between 10:1 and 200:1, wherein a first of the two or more layers of metal consists of a first hardness and a second of the two or more layers of metal consists of a second, different hardness, and wherein the two or more layers of metal are not bonded to each other to permit sliding of the two or more layers of metal with respect to each other;
an outer jacket comprising plastic, silicone, and/or rubber; and
a bonding layer comprising a thermoplastic elastomer, the bonding layer bound to an inferior surface of an upper side of the outer jacket.

16. The flexible band of claim 15, wherein the bonding layer is further bound to an upper surface of an uppermost layer of metal of the two or more layers of metal.

17. A flexible band for use in a band-based lock, comprising:
an inner metal ribbon comprising at least three metal layers, namely a top metal layer; a bottom metal layer; and one or more middle metal layers, wherein each of the metal layers has a width to thickness ratio between 10:1 and 200:1, wherein the one or more middle metal layers and the top and/or bottom metal layers have different hardnesses, wherein at least one middle metal layer has a Rockwell hardness of between about 35 C and 45 C, and wherein the metals layers are not bonded to each other to permit sliding of the metal layers with respect to each other;
one or more inner jackets surrounding the metal layers, wherein the one or more inner jackets comprise a tear resistant material; and
an outer jacket surrounding the one or more inner jackets, wherein the outer jacket comprises plastic, silicone, and/or rubber.

18. A flexible band for use in a band-based lock, comprising:
an inner metal ribbon comprising at least three metal layers, namely a top metal layer; a bottom metal layer; and one or more middle metal layers, wherein each of the metal layers has a width to thickness ratio between 10:1 and 200:1, wherein the one or more middle metal layers and the top and/or bottom metal layers have different hardnesses, wherein at least one of the top metal layer or bottom metal layer has a Rockwell hardness of between about 55 C and 65 C, and wherein the metals layers are not bonded to each other to permit sliding of the metal layers with respect to each other;
one or more inner jackets surrounding the metal layers, wherein the one or more inner jackets comprise a tear resistant material; and
an outer jacket surrounding the one or more inner jackets, wherein the outer jacket comprises plastic, silicone, and/or rubber.

19. A flexible band for use in a band-based lock, comprising:
an inner metal ribbon comprising two or more layers of metal, wherein each layer of the two or more layers of metal has a width to thickness ratio between 10:1 and 200:1, wherein a first of the two or more layers of metal consists of a first hardness and a second of the two or more layers of metal consists of a second, different hardness, and wherein the two or more layers of metal are not bonded to each other to permit sliding of the two or more layers of metal with respect to each other;
one or more inner jackets surrounding the two or more layers of metal, wherein the one or more inner jackets comprise a tear resistant material;

an outer jacket surrounding the one or more inner jackets, wherein the outer jacket comprises plastic, silicone, and/or rubber; and a wire disposed within the outer jacket and running along an edge of the flexible band adjacent to the inner metal ribbon.

* * * * *